(12) United States Patent
Schmidt

(10) Patent No.: US 11,739,004 B2
(45) Date of Patent: Aug. 29, 2023

(54) DEVICE FOR THE PURIFICATION OF FLUIDS, NOZZLE INSERT FOR ION EXCHANGE COLUMN, METHOD OF DEIONIZING A FLUID AND USE OF SUCH A DEVICE

(71) Applicant: Xiang Zhu, Shenzhen (CN)

(72) Inventor: Harald Schmidt, Dörth (DE)

(73) Assignee: Xiang Zhu, Shenzhen (CN)

( * ) Notice: Subject to any disclaimer, the term of this patent is extended or adjusted under 35 U.S.C. 154(b) by 87 days.

(21) Appl. No.: 17/290,621

(22) PCT Filed: Oct. 29, 2019

(86) PCT No.: PCT/EP2019/079466
§ 371 (c)(1),
(2) Date: Apr. 30, 2021

(87) PCT Pub. No.: WO2020/089200
PCT Pub. Date: May 7, 2020

(65) Prior Publication Data
US 2021/0380434 A1     Dec. 9, 2021

(30) Foreign Application Priority Data
Oct. 30, 2018   (DE) .......................... 102018127027.5

(51) Int. Cl.
*C02F 1/00*       (2023.01)
*B01J 47/012*   (2017.01)
(Continued)

(52) U.S. Cl.
CPC .............. *C02F 1/006* (2013.01); *B01J 47/012* (2017.01); *B01J 47/026* (2013.01); *C02F 1/42* (2013.01); *C02F 2201/003* (2013.01); *C02F 2201/004* (2013.01); *C02F 2203/008* (2013.01); *C02F 2303/16* (2013.01)

(58) Field of Classification Search
None
See application file for complete search history.

(56) References Cited

U.S. PATENT DOCUMENTS

| | | |
|---|---|---|
| 6,071,405 A | 6/2000 | Freudenthaller |
| 2018/0065863 A1 | 3/2018 | Wilder et al. |

FOREIGN PATENT DOCUMENTS

| | | |
|---|---|---|
| DE | 1932205 | 1/1971 |
| DE | 3418102 | 9/1985 |

(Continued)

OTHER PUBLICATIONS

International Search Report for International Application PCT/EP2019/079466, dated Feb. 4, 2020.

*Primary Examiner* — Chester T Barry
(74) *Attorney, Agent, or Firm* — Burris Law, PLLC

(57) ABSTRACT

A device for purifying at least one fluid is provided. The device includes at least a first ion exchange column, an inlet line and an outlet line. The inlet line and the outlet line are associated with a cover part, the inlet line is connected to a first supply line into a first free space between a bottom part and at least one nozzle insert, which is formed as a first bottom nozzle insert, and the nozzle insert has a number of openings for the passage of the fluid. The openings are distributed over at least a partial surface of the nozzle insert, by which the fluid can be introduced into a first volume of the ion exchange column which can be filled with an ion exchange resin.

20 Claims, 13 Drawing Sheets

Figure 1:
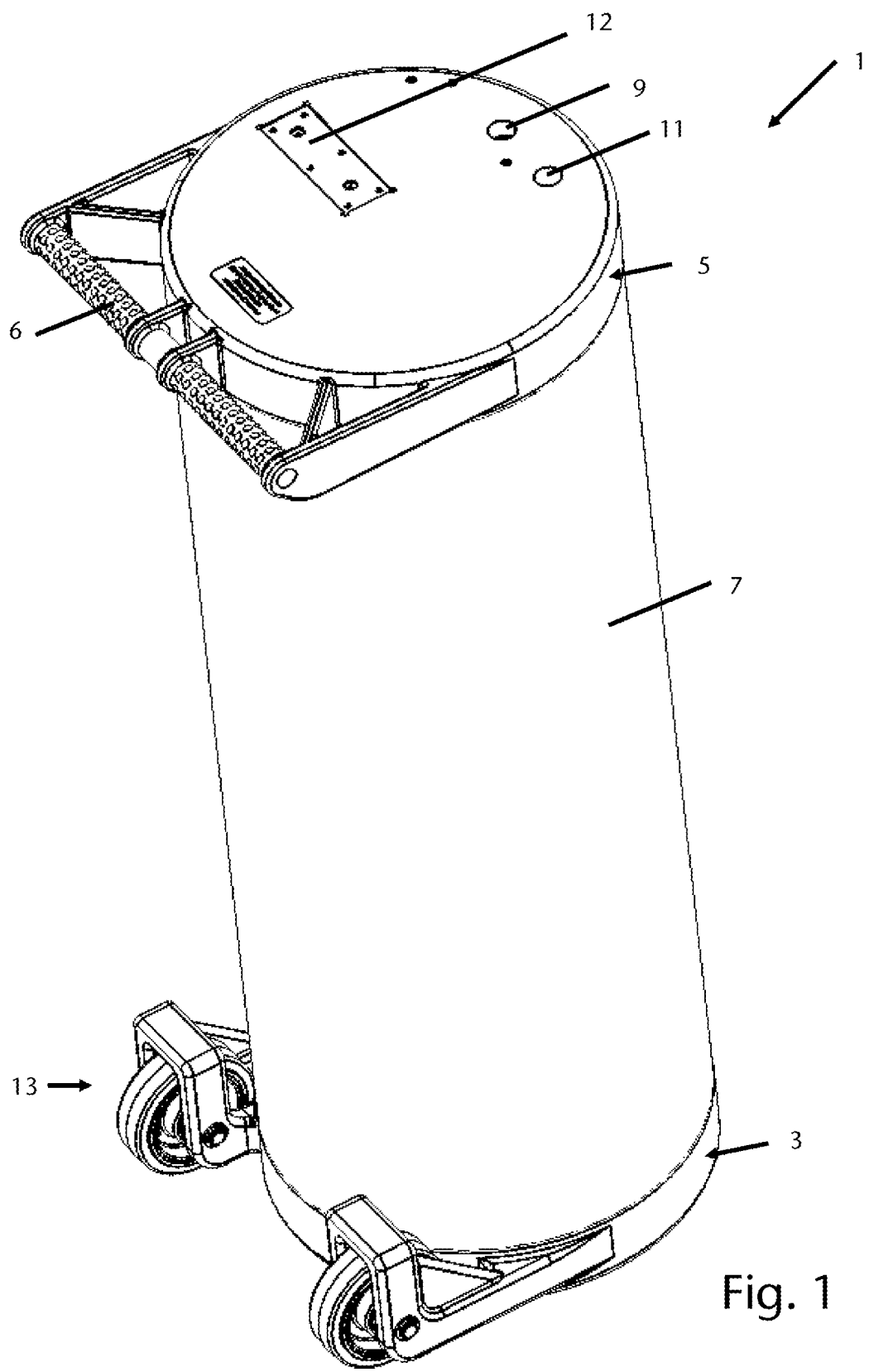

(51) Int. Cl.
*B01J 47/026* (2017.01)
*C02F 1/42* (2023.01)

(56) References Cited

FOREIGN PATENT DOCUMENTS

| | | |
|---|---|---|
| DE | 3442896 | 5/1986 |
| DE | 19736499 | 2/1999 |
| DE | 102015122761 | 6/2017 |
| EP | 0807605 | 11/2000 |

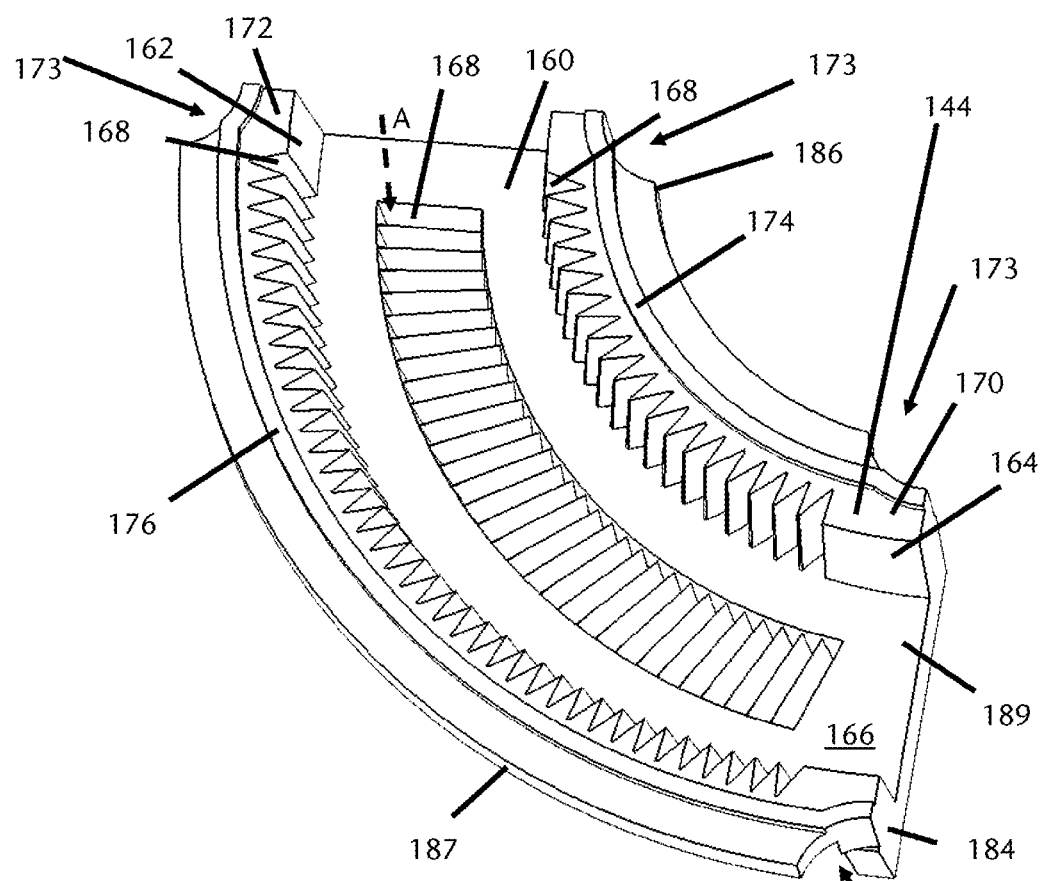
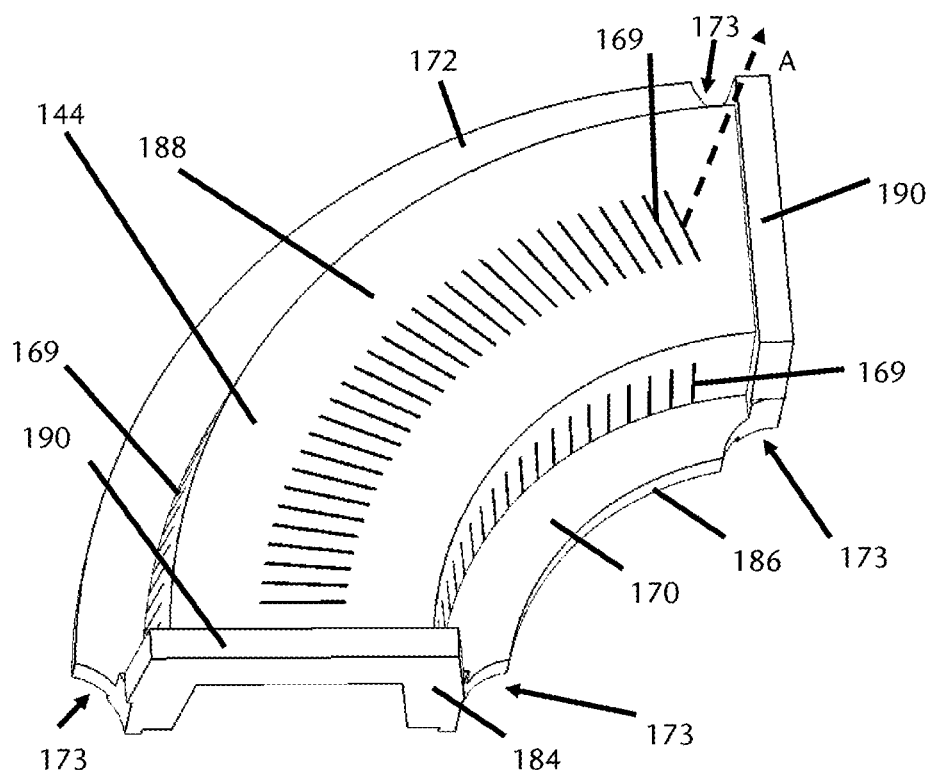
Fig. 14
Fig. 15

DEVICE FOR THE PURIFICATION OF FLUIDS, NOZZLE INSERT FOR ION EXCHANGE COLUMN, METHOD OF DEIONIZING A FLUID AND USE OF SUCH A DEVICE

CROSS-REFERENCE TO RELATED APPLICATIONS

This application is a National Phase of International Application No. PCT/EP2019/079466, filed on Oct. 29, 2019, which claims priority to and the benefit of DE 102018127027.5 filed on Oct. 30, 2018. The disclosures of the above applications are incorporated herein by reference.

FIELD

The present disclosure relates to a device for purifying at least one fluid, comprising a first ion exchange column, an inlet line and an outlet line. Furthermore, the present disclosure relates to a nozzle insert for at least one ion exchange column, a method for deionizing a fluid by such kind of device as well as a use of such a device.

BACKGROUND

The statements in this section merely provide background information related to the present disclosure and may not constitute prior art.

Devices for purifying and in particular for deionizing liquids are generally known from the prior art. For example, DE 19 32 205 A1 describes a device for purifying and deionizing a liquid, in particular waste water from galvanic processes, with the aid of ion exchangers which are housed in containers through which the liquid flows. Among other things, the publication states that a retaining body is provided in the vicinity of each of the bores of the container pipes from which the liquid to be purified emerges, which surrounds the container pipe and acts as a filter and/or a nozzle for retaining the ion exchange agent.

EP 0 807 605 B1 describes a device for desalination and treatment of water, in which two ion exchange columns are connected in series, one of which is filled with anion exchange resin and the other with cation exchange resin. Inside the columns, there are sink pipes reaching down to the bottom. The two ion exchange columns are arranged in a combined, tightly sealed housing. The columns consist of a cylindrical wall, closed at the lower end by the bottom of the housing and at the upper end by the upper end wall of the housing. In the area of the columns, concentric to them, the upper end wall has a recess in which a head closing the column is inserted. Each head is provided with a supply line for the water to be treated and with a discharge line for the treated water. Concentric to the head, the inlet pipe is connected to a lowering pipe, which reaches the bottom of the column. At the lower end of the lowering pipe, a distributor head is attached, into which the lowering pipe opens and which has outlet slots for discharging the liquid to be treated into the column. The head is further provided with an annular channel concentrically surrounding the sink pipe, from which the discharge originates. Upstream of this annular channel is a collector head provided with radially directed inlet slots. The sink pipe passes tightly through this collector head. In both the distributor head and the collector head, the slots are arranged in several levels one above the other, i.e. offset in height, with the diameter of the distributor head or the collector head decreasing downward in steps from level to level.

DE 10 2015 122 761 A1 describes a deionization device for fluids. This deionization device has a first chamber for a first ion exchange medium with a first inlet opening and a first outlet opening. The first chamber is columnar in shape and arranged concentrically within a second chamber for a second ion exchange agent. The second chamber is also columnar and has a second inlet opening and a second outlet opening. The first chamber and the second chamber are connected by a conduit. This conduit has a third inlet opening and a third outlet opening. The third inlet opening is associated with the first outlet opening. The third outlet opening is associated with the second inlet opening. For deionization of a fluid, the fluid is first introduced into the first chamber through the first inlet opening. There, a first stage of deionization may be performed by a first ion exchange agent, such as a cation exchange resin. The fluid may then exit the first chamber through the first outlet opening. The exited fluid may be discharged through the third inlet opening of the conduit. The fluid exits from the conduit formed as an overflow conduit through the third outlet opening and thus enters the second inlet opening of the second chamber. In the second chamber, the fluid can be deionized by a second ion exchange agent, for example an anion exchange resin, in a second stage. The deionized fluid may then be discharged from the second outlet port of the second chamber for further use. The deionization apparatus has an enclosing housing with a housing cover. The conduit is arranged in said housing cover. The housing cover has a cover inlet opening for introducing a fluid into the deionization device. The cover inlet opening opens into a cover inlet line, which leads to the first inlet opening of the first chamber. For discharging the deionized fluid, the housing cover has a cover outlet opening which is assigned to the second outlet opening of the second chamber. The first inlet opening and the second inlet opening each open into a sink pipe. These sink pipes extend from the housing cover to a not shown bottom side area of the housing. To prevent the ion exchange agent from escaping, inserts are arranged on the housing cover, which are assigned to the respective outlet openings of the chambers.

SUMMARY

This section provides a general summary of the disclosure and is not a comprehensive disclosure of its full scope or all of its features.

The present disclosure provides an improvement to the devices for purifying fluids known from the prior art, in particular deionization devices.

Further advantageous forms can be found in the following description, the figures and the sub-claims. However, the individual features of the described form are not limited to this, but can be combined with each other and with other features for further forms.

According to a first aspect, the present disclosure proposes a device for purifying at least one fluid comprising at least a first ion exchange column, an inlet line and an outlet line. The inlet line and the outlet line are each associated with a first cover part, wherein the inlet line is connected to a first supply line into a first free space between a bottom part of the device and at least one nozzle insert, which is formed as a first bottom nozzle insert. The first bottom nozzle insert has a number of openings (e.g., a plurality of openings) for the passage of the fluid, which are distributed over at least a partial surface of the first bottom nozzle insert and by which the fluid can be introduced into a first volume of the ion exchange column which can be filled with an ion exchange resin. The first bottom nozzle insert includes at least two segment parts that are attached to each other. It is further specified that at least one segment part has at least one edge and/or at least one protrusion to enable a stable arrangement of the segment parts by positive locking, and/or that the first bottom nozzle insert has at least one connecting piece and at least two segment parts are attached to each other by the connecting piece. Wherever in the present disclosure the term "number" is used with reference to the openings of a nozzle insert, this is understood to mean at least two openings in this nozzle insert, for example 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200.

The advantage of the proposed present disclosure is that the distribution of the fluid in the ion exchange column is uniform and, in particular, no dead spaces are generated when the fluid flows through the ion exchange column. Dead spaces in the sense of the present disclosure are areas which do not have, or only have in comparison with other areas, a very low flow rate, for example at least about 30% to about 100%, at least about 50% to about 100%, or about 90% to about 100% lower than, for example, the inlet points of the fluid into the ion exchange column.

In one form of this aspect, it is specified that the at least two segment parts are ring-segment shaped or circular-segment shaped.

If the term "about" is used in the context of the present disclosure, in particular for values or value ranges, this is to be understood as a tolerance range which a person skilled in the art considers to be customary. In particular, a tolerance range of +/−10%, for example +/−5% is to be understood. If the term "substantially" is used in the context of the present disclosure, this is to be understood as a range of tolerance which is acceptable to the person skilled in the art from an economic and technical point of view, so that the feature can still be recognized as such.

In some variations, device has several nozzle inserts, for example at least two nozzle inserts. At least one first nozzle insert designed as a cover nozzle insert is arranged on the cover part. In the area of the bottom of the device, at least one first nozzle insert designed as a bottom nozzle insert for the first ion exchange column is arranged. In the area of the bottom of the device, at least a second nozzle insert designed as a bottom nozzle insert for a second ion exchange column is arranged, so that a bottom nozzle insert is assigned to each column of the device. Accordingly, the device can also have at least a first, and particularly a first and a second cover nozzle insert. The cover nozzle inserts described above can each be arranged on the cover part. The bottom nozzle inserts described above can each be arranged on the bottom part.

In an alternative form, it is provided that a nozzle insert is at least partially corrugated. In particular, in a further variant, it is provided that corrugations are at least partially concentric. The nozzle insert can, for example, have at least one groove as a corrugation. The nozzle insert can have several concentrically arranged, annular grooves. The corrugated shape allows the openings to be distributed over a large area and, in particular, to introduce a large number of openings into the nozzle insert. In one form, it is provided that the corrugations at least partially have an approximately rectangular or trapezoidal cross-section. An approximately triangular cross-section is also possible. Thus, according to a further form, it can also be provided that the openings are arranged at least on flanks of the corrugations and/or at least on crests of the corrugations. In one form the openings are arranged on the flanks of the corrugations. Due to the substantially opposite arrangement of the openings on the flanks of the corrugated shape provided in a further form, a flow characteristic, in particular a turbulence, of the flow occurs, which provides a further advantageous distribution in the ion exchange column or when entering the ion exchange column. By introducing the fluid into the ion exchange column as described, the ion exchange column or the ion exchange resin in the ion exchange column is flown through or around uniformly.

The nozzle insert comprises at least two segment parts. The segment parts are in the form of ring sections. These segment parts can also be formed in the shape of circular sections, for example in the shape of a "pie slice". The segment parts can be attached to each other directly or indirectly. The nozzle insert and/or the segment part can be designed as a thin plate. The nozzle insert and/or the segment part can be about 1 to 4 millimeters thin.

At least one segment part is plate-like. The segment part has at least one flat top side and one flat bottom side. The segment part has at least two straight end faces and two curved longitudinal sides which frame the top side and the bottom side. The end faces are used to arrange the segment parts against each other. For example, several segment parts can be arranged next to each other to form a circular nozzle insert. In some variations, four segment parts can be arranged together to form a circular or annular nozzle insert. Multiple segment parts can also be arranged to form a nozzle insert in the form of an arc or an open ring. For example, ten segment parts can be arranged to form a nozzle insert in the form of an open ring.

At least one nozzle insert and/or at least one segment part of the nozzle insert has at least one groove with a first side wall, a second side wall opposite thereto and a bottom connecting the side walls. The groove, like the undulating form described above, serves to increase the surface area in order to be able to arrange many openings for the fluid. Accordingly, the openings are formed on the first side wall, the second side wall and/or the bottom of the groove. The groove or "corrugation" can also have soft, rounded transitions between the bottom and the side walls. The groove can have no edges. The groove can have an approximately rectangular or trapezoidal cross-section, at least in part, as described above for the corrugated design. An approximately triangular cross-section is also possible. The groove then has substantially no bottom, but only opposite side walls.

The groove is arranged on a so-called upstream side of the nozzle insert. In the case of a bottom nozzle insert, this is, for example, the bottom side of the bottom nozzle insert in relation to the normal flow direction during operation of the device. In the case of a cover nozzle insert, this is, for example, the top side of the cover nozzle insert in relation to the normal flow direction during regeneration of the device.

At least one segment part has at least one edge, for example two edges, in order to enable stable arrangement of the segment parts by, for example, a form fit at the edge or edges. Each segment part may have, relative to the curvature of the segment parts, a first inner edge which projects outwardly from an end of the inner sidewall facing away from the bottom and parallel to the bottom. Each segment part may include a second outer edge protruding outwardly from an end of the outer sidewall facing away from the bottom nozzle insert and parallel to the bottom.

At least one segment part has at least one projection and in some variations at least two projections. Like the edges described above, these projections serve to enable a stable arrangement of the segment parts by, for example, a form fit. The projection is formed on the top side of the segment parts and projects away from the top side. The projection is formed in the area of the rear side of the groove. A segment part can have two elongated projections, each of which is arranged in the area of the straight end faces of the segment parts. In some variations, the segment parts of a nozzle insert are formed identically to one another. Different types of segment parts can be used for different nozzle inserts, with the types of segment parts differing substantially only in length and/or curvature. This also applies accordingly to the connecting pieces for the segment parts described below.

The nozzle insert has at least one connecting piece, at least two segment parts being attached to one another by the connecting piece. The attachment can take place indirectly, with the connecting piece being attached directly to a component and the segment parts being fixed to one another, for example by a force fit and/or form fit, between the connecting piece and the component, for example a carrier plate.

The connecting piece can have at least two foot parts. To increase the stability and the standing area, the foot parts can have widenings and/or reinforcing struts. At least one fastening eyelet can be formed on each of the foot parts. The foot parts of the connecting piece can each have at least one receptacle for at least one of the edges of the segment parts described above. Contact surfaces for arranging on the carrier plate are formed on the foot parts in each case adjacent to the receptacles.

The foot parts can be connected by a bridge-like web. The web has an inverted substantially U-shaped cross-section. The web comprises, for example, at least two laterally angled sections connected to the foot parts at one end and facing each other. The web further comprises, for example, at least one connecting section that connects the angled gates to one another. The connecting section comprises two end faces. At least two spaced-apart support sections are arranged on each of these end faces in a particularly preferred manner. For example, a total of four support sections are formed on the connecting section. The support sections can substantially be formed as curved cuboids that protrude from the end faces of the connecting section. The underside of the connecting section and the support sections serves as a contact surface for the rear side of the bottom of the groove of the segment parts. The support sections are aligned so that when the segment parts and connecting sections are assembled, the openings of the segment parts are not blocked. The connecting piece can have support sections of different lengths. For example, in addition to having a pair of long support sections on one end face of the connecting piece, a connecting piece may also have a pair of short support sections on the other end face so that the connecting piece can be arranged at one end of a curved nozzle insert without the support sections protruding unnecessarily far from the end and preventing, for example, the arrangement of a supply line adjacent the nozzle insert.

The connecting piece can have at least one receptacle for arranging at least one projection of a segment part and/or at least one edge of a segment part. The receptacle is formed as a recess to enable an at least partially form-fitting arrangement.

The web can have at least one receptacle for a projection, for example for two projections. This allows the projections of two adjacently arranged segment parts to be advantageously arranged in the receptacle in order to attach these segment parts to one another. The nozzle insert has at least one carrier plate for arranging the nozzle insert in the device. The carrier plate can be made of several parts. This means in particular that at least two carrier plates can be used. For example, each ion exchange column of the device can be assigned at least one carrier plate on which at least one nozzle insert can be arranged. In the area of the bottom of the device, at least one carrier plate can be used for at least one bottom nozzle insert. In the area of the cover, at least one carrier plate can be used for at least one cover nozzle insert.

The connecting pieces and/or the carrier plate have at least one fastening eyelet in each case, for example at least two fastening eyelets. The aforementioned eyelets may be designed for the passage of pins, rivets or screws. The eyelets may each have a thread. The connecting pieces each have, particularly preferably, two eyelets. The carrier plate may have a corresponding number of eyelets depending on the number of eyelets of the associated connecting pieces. For example, an inner circular section of the carrier plate has eight eyelets for a first bottom nozzle insert with four segment parts and connectors. An outer annular section of the carrier plate has, for example, twenty-two eyelets for a second bottom nozzle insert with 10 segment parts and 10 connectors.

The carrier plate has at least one groove, for example two pairs of grooves, for corresponding projections of the nozzle inserts or of the aforementioned segment parts to provide non-slip contact of at least one nozzle insert. A pair of grooves may be arranged, for example, in the form of concentric circles on the carrier plate. A pair of grooves can be arranged, for example, in the form of parallel circular sections on the carrier plate.

The nozzle insert can have at least one end piece, for example two end pieces. The end piece is designed for contact with an end face of a segment part. By two end pieces, an, for example, arc-shaped nozzle insert can be closed laterally so that fluid can flow in or out of a free space between the nozzle insert and the carrier plate only via the openings of the segment part or segment parts. In some variations, the end piece is arranged in such a way that it practically connects opposite grooves of the carrier plate.

The carrier plate is designed as a combined carrier plate for at least two nozzle inserts, for example for two bottom nozzle inserts or two cover nozzle inserts. For example, the carrier plate may be formed as an intermediate bottom spaced from a bottom, a bottom cover of the bottom part, a top of the cover part, or a cover plate of the cover part. The carrier plate is formed integrally with the bottom part. The device may further comprise a carrier plate which is formed integrally with the cover part. To increase stability, the carrier plate can have ribbing. Conduits can be arranged on the carrier plate. The ribbing and/or the conduits are arranged on a side of the carrier plate facing away from the ion exchange columns. For example, the top of the support plate of the cover part can have a ribbing, an overflow line from the first to the second ion exchange column, an inlet line to the first ion exchange column and an outlet line from the second ion exchange column. The carrier plate of the bottom part can, for example, have ribbing on the underside, a first conduit from a connection piece for a supply line to an opening or to an outlet in the carrier plate, and a second conduit from a connection piece for a further supply line to a further opening or to a further outlet in the carrier plate.

To provide separation of at least two ion exchange columns of the device, the carrier plate or the bottom part may have at least one separating wall or a contact surface for arranging a separating wall. The carrier plate can have an inner annular separating wall and an outer annular separating wall. The separating wall is formed integrally with the carrier plate. The cover part or a carrier plate arranged in this area can be formed as described above and also have at least one separating wall or a contact surface for a separating wall.

The carrier plate has at least two flow-through openings per associated nozzle insert. The flow openings can each have a connection piece for arranging a supply line. The flow openings can each have at least one outlet for the fluid. The flow openings are formed round for easy manufacturing. A combined carrier plate for two nozzle inserts has two pairs of flow openings.

For example, a combined carrier plate for two bottom nozzle inserts may include an inner circular section for a first bottom nozzle insert and the first ion exchange column, and an outer annular section for a second bottom nozzle insert and the second ion exchange column. Two flow openings can be formed in each of the inner and outer sections of the carrier plate. In each case, a flow opening is provided to direct fluid into the free space between the respective section of the carrier plate and the bottom part, the bottom plate, the top of the cover or the cover plate of the device. The second flow opening is provided as an outlet to direct fluid into the free space between the nozzle insert and the bottom part or the cover part. This free space can be provided, for example, by a groove on the upstream side of the segment parts and the respective carrier plate section. The fluid can then flow uniformly into the respective ion exchange column from the slots on a downstream side of the segment parts.

A carrier plate spaced from the closed top of the cover may similarly be arranged in the cover part.

The carrier plate can have protrusions which allow the carrier plate to be clamped in the device, in particular on the bottom part and/or on the cover. For example, the carrier plate can be inserted into the device and clamped and/or glued there. Particularly preferably, the bottom part and/or the cover part has a carrier plate which is in each case formed integrally with the bottom part or the cover part.

In the bottom area, the device comprises, for example, a first bottom nozzle insert for the first volume and a second bottom nozzle insert for the second volume. These bottom nozzle inserts are attached to a combined carrier plate by previously described connecting pieces. For example, the first bottom nozzle insert is arranged in an inner circular section of the carrier plate, and the second bottom nozzle insert is arranged in an outer annular section of the carrier plate, for example.

In a further form, it is provided that the openings at least partially have a narrowing cross-section in a flow direction. Each of these openings is designed as a nozzle, in particular during regular operation of the device. This has the advantage that the flow velocity of the fluid in the area of the bottom nozzle insert is substantially increased, so that a more uniform and easier throughput of the fluid through the ion exchange material, in particular resin, present in the ion exchange column is accomplished. According to one form, it is provided that the openings are slot-shaped at least on an outflow side of the nozzle insert. The downstream side is the side of the nozzle insert that is arranged downstream of the fluid during regular operation. The openings thus narrow in the direction of flow to form slots.

In a further form, it is provided that at least a first cover nozzle insert is associated with the cover part. In some variations, the cover nozzle insert is largely identical, or at least functionally identical, to the bottom nozzle insert, wherein in one form the cover nozzle insert acts as a diffuser, in particular during regular operation of the device. On the other hand, according to one form, during a regeneration pass in which regeneration liquid is passed through the device in the opposite direction to the flow direction provided during regular operation of the device, the cover nozzle insert acts as a nozzle. A uniform and dead space-free flow of the regeneration medium through the ion exchanger is thus made possible.

In a particularly preferred form, it is provided that the device has at least two ion exchange columns interleaved within one another. According to a further form, the device with two ion exchange columns is configured in such a way that a bottom part and a cover part are comprised by the device, wherein at least one inner tube and one outer tube are arranged between the bottom part and the cover part, wherein the inner tube is arranged in the outer tube. Thus, a first ion exchange column comprises the first volume of the inner tube and a second ion exchange column comprises a second volume present between the inner tube and the outer tube. In a further variant, it is provided that the cover part comprises an inlet line, which is connected to a first supply line, and an outlet line. The cover part comprises an overflow line connecting the first volume to the second volume present between the inner tube and the outer tube. In one form, the overflow line is connected to a second supply line. The overflow line has two closable recesses, a first recess being associated with the first volume and a second recess being associated with the second volume. Advantageously, the proposed design of the device can provide a compact unit for the deionization of water. In particular, the device can be designed to be transportable, for example movable on rollers.

According to a second aspect, the present disclosure proposes a nozzle insert for at least one ion exchange column, wherein the nozzle insert has a number of openings which are distributed over at least a partial surface of the nozzle insert and by which a fluid can be introduced into the ion exchange column. The nozzle insert comprises at least two ring-section-shaped or circular-section-shaped segment parts that are attached to each other.

The nozzle insert may be of the same design as a nozzle insert described with respect to the device. In some variations, the openings have a narrowing cross-section and thus form nozzle openings. Furthermore, one form provides that the openings are slot-shaped at least on one downstream side. The openings thus narrow in the direction of flow of the fluid to form slots. The nozzle insert has at least two ring-section-shaped or circular-section-shaped segment parts that are attached to one another. The nozzle insert has at least one carrier plate, the carrier plate comprising at least two openings for the passage of the fluid. The nozzle insert has at least one groove with a first side wall, a second side wall opposite thereto and a bottom connecting the side walls. The openings of the nozzle insert are formed on the first side wall, the second side wall and/or the bottom of the groove.

In one form, it is provided that the nozzle insert has at least one attachment groove into which an inner tube can be inserted. In particular, this form allows the formation of an internal column by providing an inner tube that is inserted into the attachment groove. In a further form, it is provided that the nozzle insert has a number of attachment grooves into which different inner tubes with different diameters can be inserted. In this way, different ratios of the volumes of the ion exchange columns formed by the tubes are possible. Where the term "number" is used in the present disclosure with reference to the attachment grooves, this is understood to mean at least two attachment grooves, for example 2, 3, 4, 5, 6, 7, 8, 9, 10.

In a further form, it is provided that the volumes of the ion exchange columns, which are arranged concentrically with respect to each other, are obtained by two nozzle inserts, in particular bottom and/or top nozzle inserts, which are arranged in the device. In some variations, a number of two bottom nozzle inserts and/or two cover nozzle inserts, each of which can be arranged concentrically in one another, are arranged in different forms for different ratios of the volumes of the two ion exchange columns in the device. Particularly preferably, the ratios of the first volume to the second volume are about 1:2, about 2:1, about 2:3, or about 3:2. In a particularly preferred form, it is provided that the nozzle inserts are provided as spare parts or replacement parts.

According to a third aspect, the present disclosure proposes a method for deionizing a fluid by a device according to the present disclosure, wherein the fluid is passed without ion exchange through the first supply line through the first volume of a first ion exchange column which can be filled with an ion exchange resin, wherein the fluid is then introduced into the first volume of the first ion exchange column for ion exchange.

This allows a particularly compact ion exchange with a uniform flow compared to a direct introduction into the volume. By the method, the fluid can, for example, be fed below the volume, for example into a free space of the device, and then be introduced back into the volume from below via the bottom nozzle insert, so that the fluid then rises uniformly in the volume from bottom to top.

In one form, it is provided that the fluid is introduced into said inlet line and is directed through the first supply line into the first free space. By way or through the openings the fluid is introduced into the first volume, so that the fluid flows through the first ion exchange column.

By way or through the first supply line, the fluid can be passed downward through the first volume, which is filled with an ion exchange resin, into the first free space without ion exchange. The fluid can then be introduced through the first bottom nozzle insert from below the free space into the first volume for ion exchange. The fluid can thus rise from the bottom to the top of the first volume. The bottom nozzle insert provides a particularly uniform introduction into the first volume.

In one form, it is provided that the fluid is passed without ion exchange through a second volume of a second ion exchange column filled with an ion exchange resin, the fluid then being subsequently introduced into the second volume for ion exchange.

In one form, it is provided that the fluid is passed via an overflow line into a second supply line, the second supply line opening into a second free space between a nozzle bottom insert designed as a second nozzle insert and the bottom part, the second bottom nozzle insert having a number of openings which are distributed over at least a partial surface of the second bottom nozzle insert and by way or through which the fluid is introduced into the second volume, so that the fluid flows through the second ion exchange column.

By way or through the second supply line, the fluid can be passed through the second volume of the second ion exchange column, which can be filled with an ion exchange resin, downward into the second free space without ion exchange. The fluid can then be passed through the second bottom nozzle insert from the free space at the bottom into the second volume for ion exchange. The fluid can thus rise from the bottom to the top of the second volume.

The overflow line, in some variations, is arranged in the cover part of the device. Furthermore, in at least one variation the fluid is introduced from a centrally arranged ion exchange column via the overflow line into a radially outer ion exchange column.

The advantage of directing the fluid from the bottom part to the cover part, that is from the bottom to the top, is also that gas formation or an accumulation of gas in the ion exchange column is avoided and can be discharged in particular via the cover. Any gas that forms in the bottom section or in the ion exchange column is easily entrained by the flow from bottom to top.

According to a fourth aspect, the present disclosure proposes a use of a device according to the present disclosure for deionization of a fluid.

In one form of this aspect, it is specified that.
the fluid is passed through the first volume filled with an ion exchange resin without ion exchange,
the fluid is then subsequently introduced into the first volume for ion exchange.

According to a fifth aspect, the present disclosure proposes a use of a device according to the present disclosure in a method according to the present disclosure.

According to a first form of the device, it has four corrugated nozzle inserts. These comprise two cover nozzle inserts and two bottom nozzle inserts. Further, the device comprises an inlet line and an outlet line. The inlet line is connected to a first supply line. The inlet and the outlet lines are arranged on a cover member. An outer tube and an inner tube are arranged between the bottom part and the cover part. These define a first and a second volume for different ion exchange resins. An overflow line is also arranged in the cover part between the first and second volumes. The volumes are closed off at the bottom by two bottom nozzle inserts. The bottom nozzle inserts each have a number of corrugations. Openings are provided on the flanks of the corrugations through which the fluid to be cleaned can flow. The openings narrow from the underside of the bottom nozzle inserts to slots on the upper side. The openings thus narrow in the direction of flow of the fluid. The fluid flows through a first supply line from the outlet into a first free space between the first bottom nozzle insert and the bottom part and from there out of the openings or slots of the first bottom nozzle insert into the first volume. After passing through the openings of the first cover nozzle insert, it flows through the overflow line into a second supply line and then into a free space between the second bottom nozzle insert and the bottom part. The fluid then flows through the openings of the second bottom nozzle insert into the second volume. The fluid rises and flows through the openings of the second cover nozzle insert to the outlet line. The cover nozzle inserts are arranged in the device in such a way that they act as nozzles when the regeneration liquid passes through the individual ion exchangers against the direction of flow of the regular liquid to be deionized. In the case of the cover nozzle inserts, the slots are arranged accordingly on the underside of the cover nozzle inserts. Insofar as the term "number" is used in the present disclosure with reference to the corrugations, this is understood to mean at least two corrugations, for example 2, 3, 4, 5, 6, 7, 8, 9, 10.

The second form differs from the first in that the nozzle inserts comprise a plurality of annular segment parts having the openings, the segment parts being secured to each other by connecting pieces, and in that the cover part and the bottom part each comprise a carrier plate for arranging the nozzle inserts. The segment parts of the nozzle inserts each comprise a groove with a first side wall, a second side wall opposite this and a bottom connecting the side walls. The openings for the fluid are formed on the grooves. The carrier plates are each formed integrally with the bottom part and the cover part. The carrier plate of the bottom part has an inner circular section for a first bottom nozzle insert and an outer annular section for a second bottom nozzle insert. A first free space is formed between the first bottom nozzle insert and the bottom part. A second free space is arranged between the second bottom nozzle insert and the bottom part. As in the first form, the supply lines open into these free spaces respectively. For arranging the inner tube and the outer tube, the carrier plate has an inner annular separating wall and an outer annular separating wall, which are also formed integrally with the bottom part. The carrier plate and the two cover nozzle inserts in the cover part are arranged substantially in mirror image to the bottom nozzle inserts.

Further areas of applicability will become apparent from the description provided herein. It should be understood that the description and specific examples are intended for purposes of illustration only and are not intended to limit the scope of the present disclosure.

DRAWINGS

Figure 2:
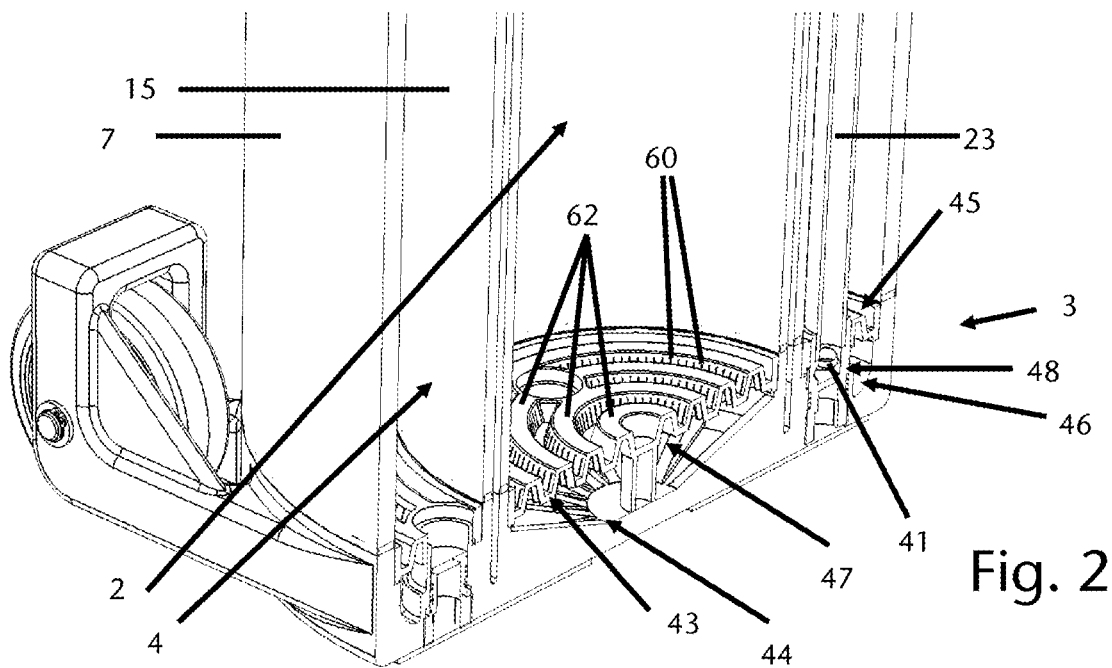
Figure 3:
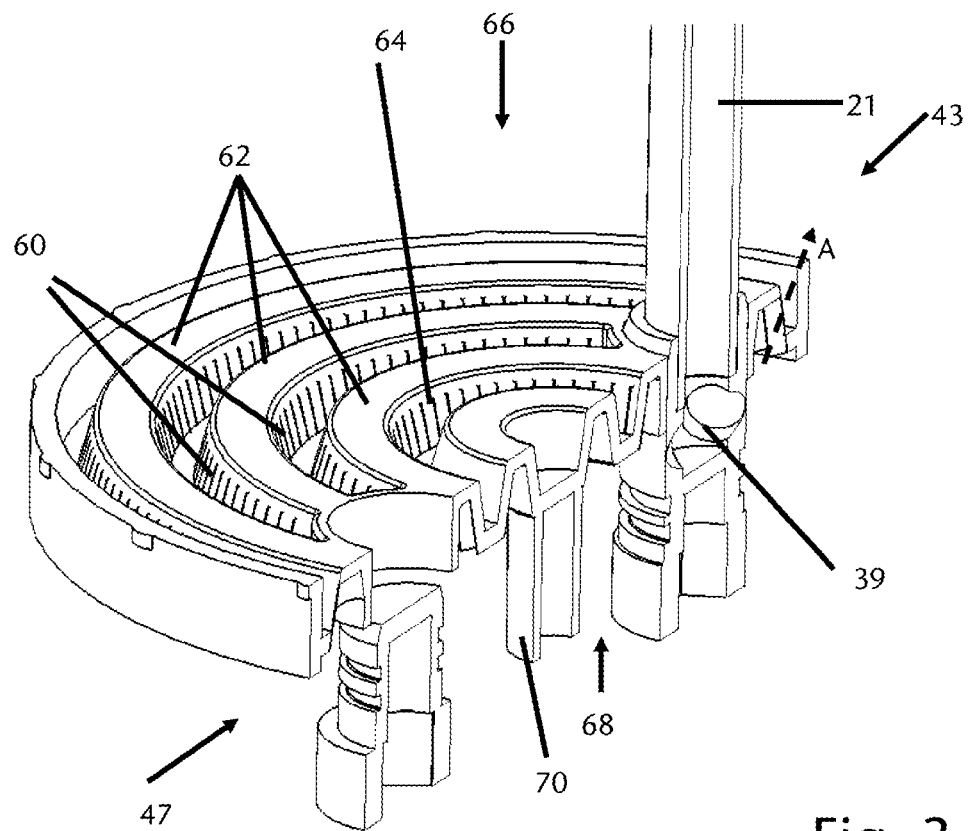
Figure 4:
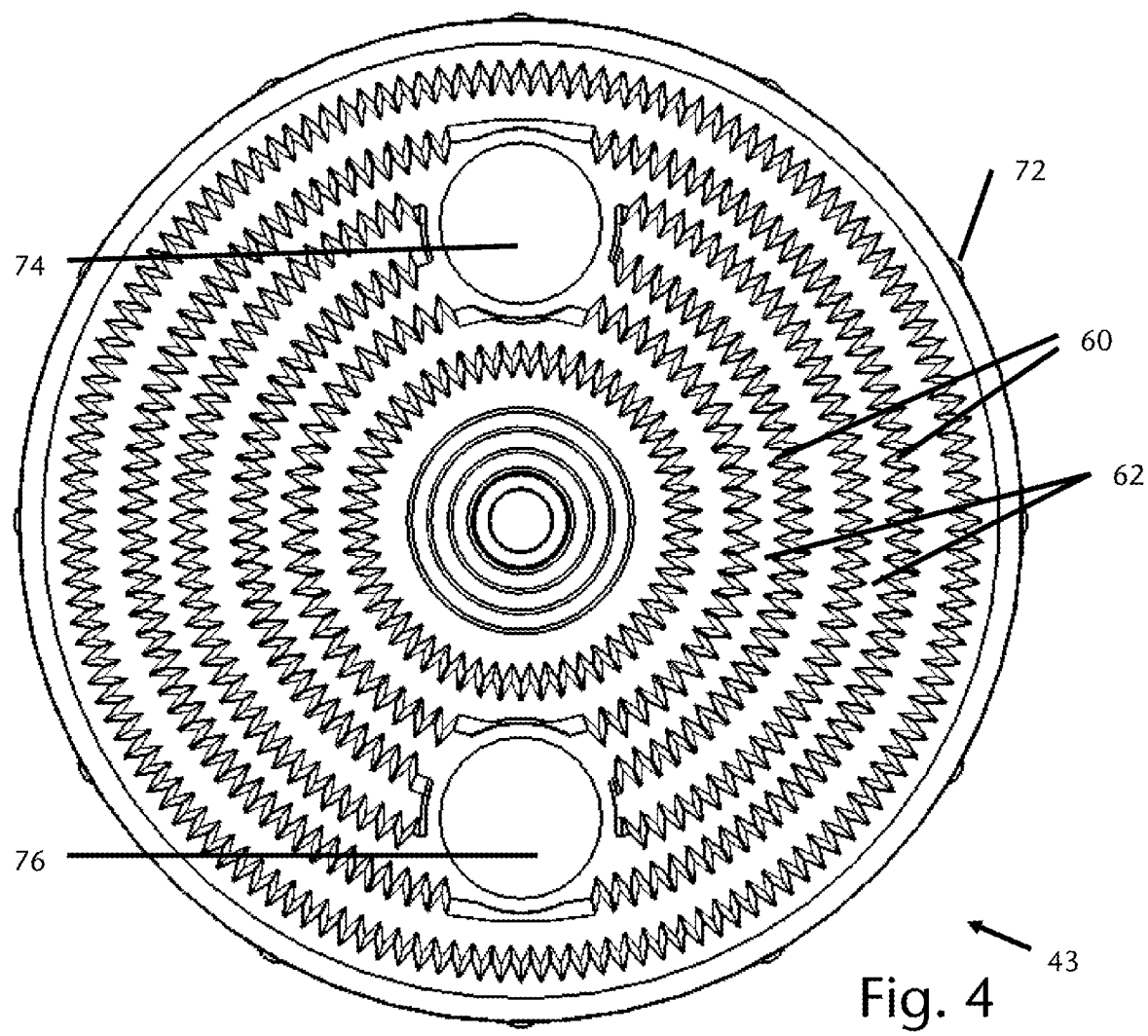
Figure 5:
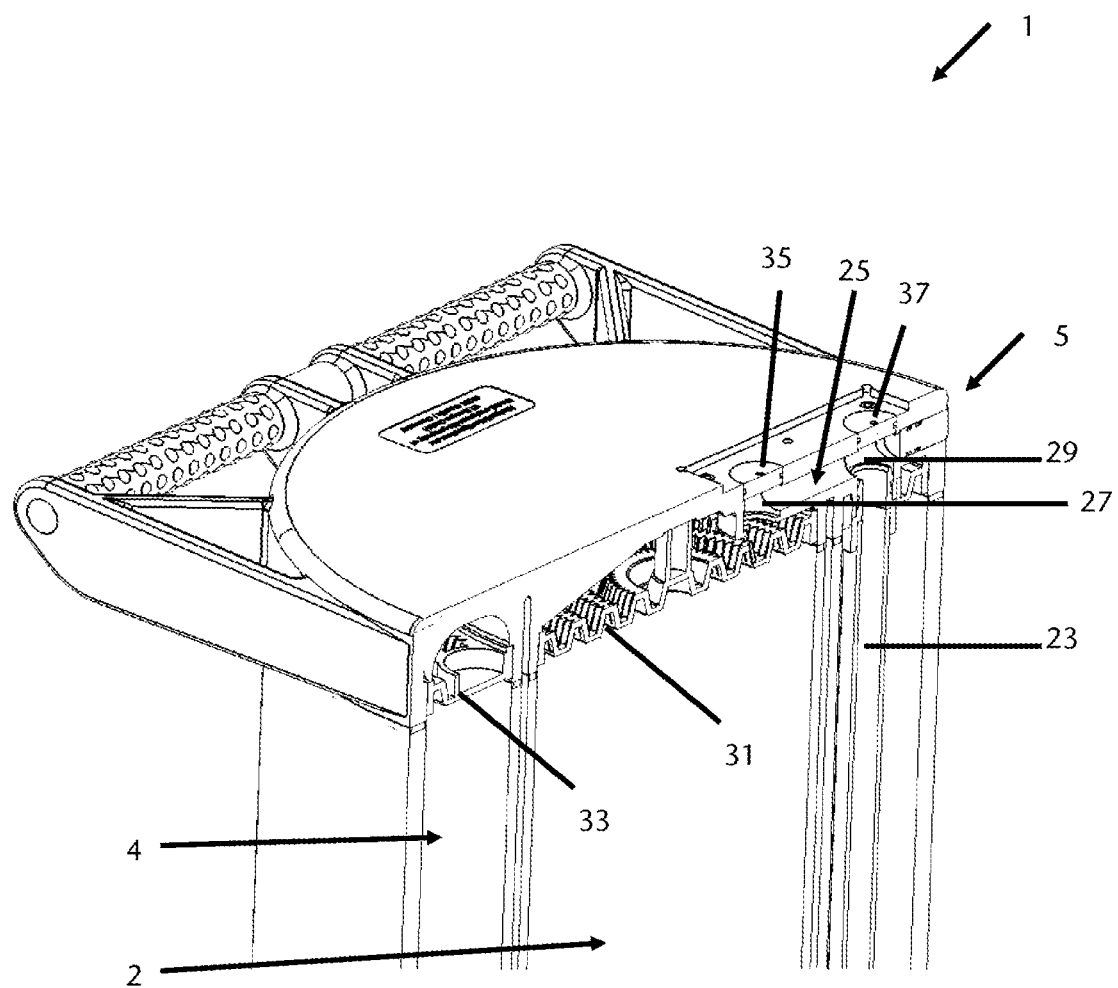
Figure 6:
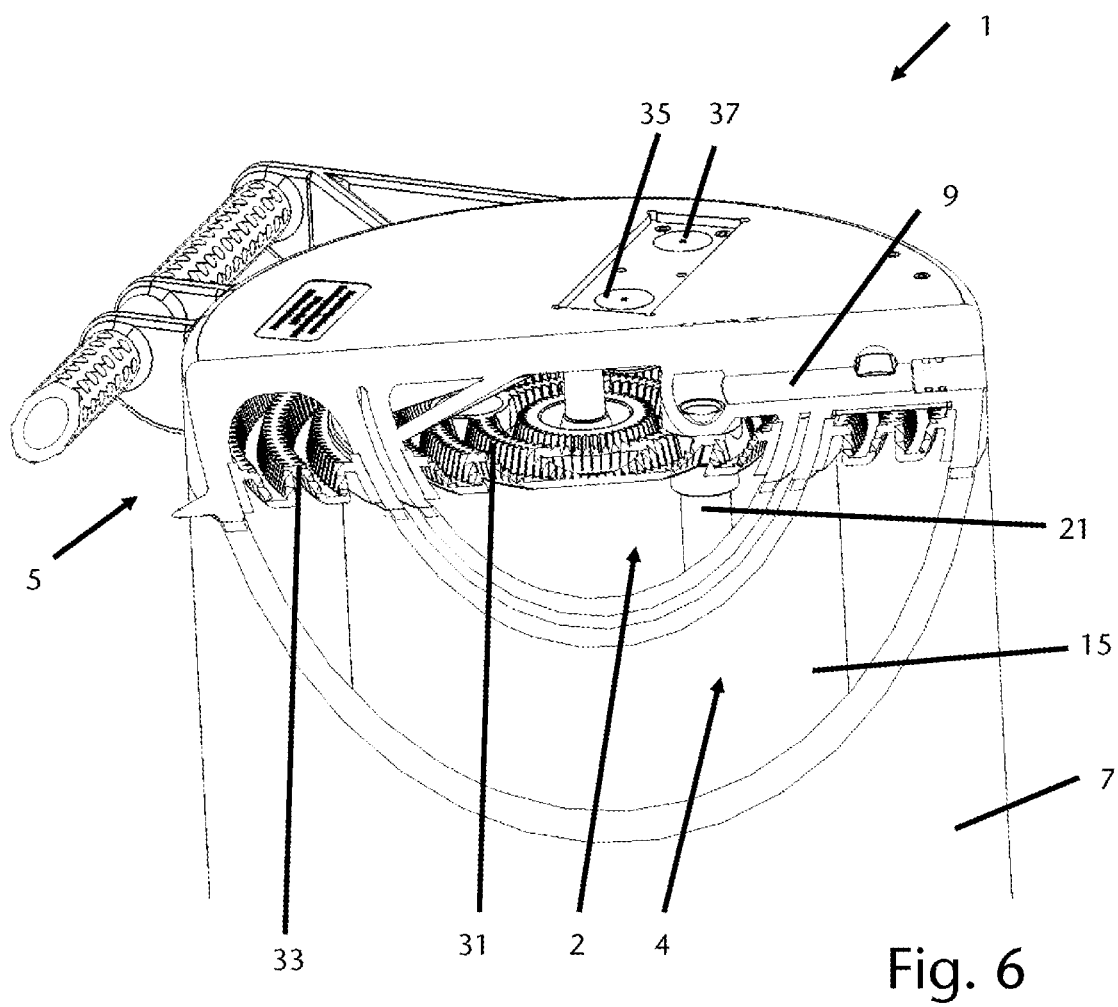
Figure 7:
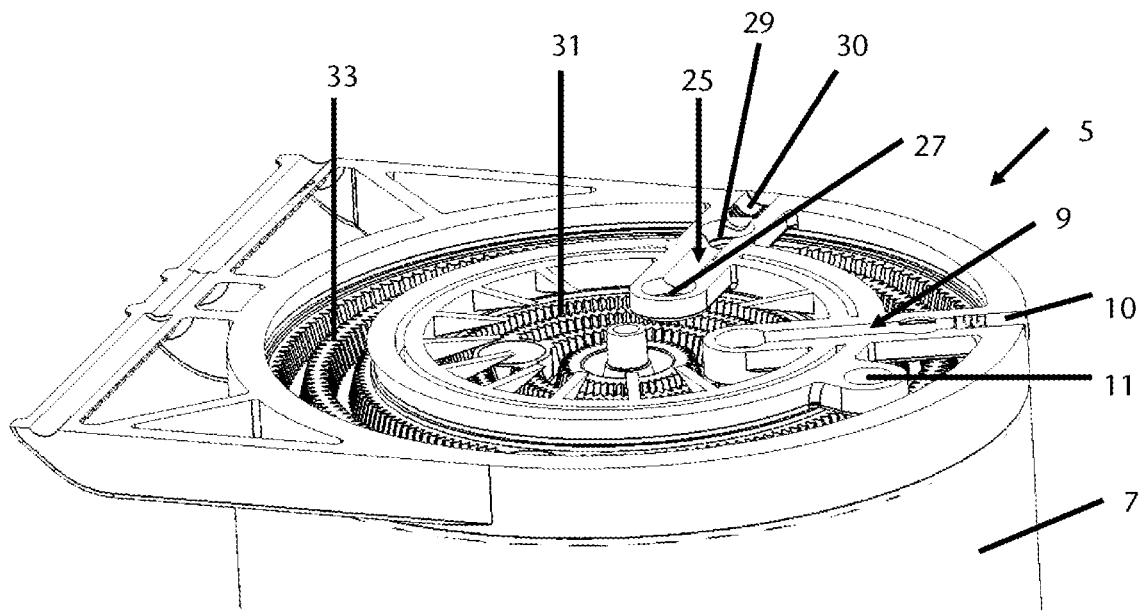
Figure 8:
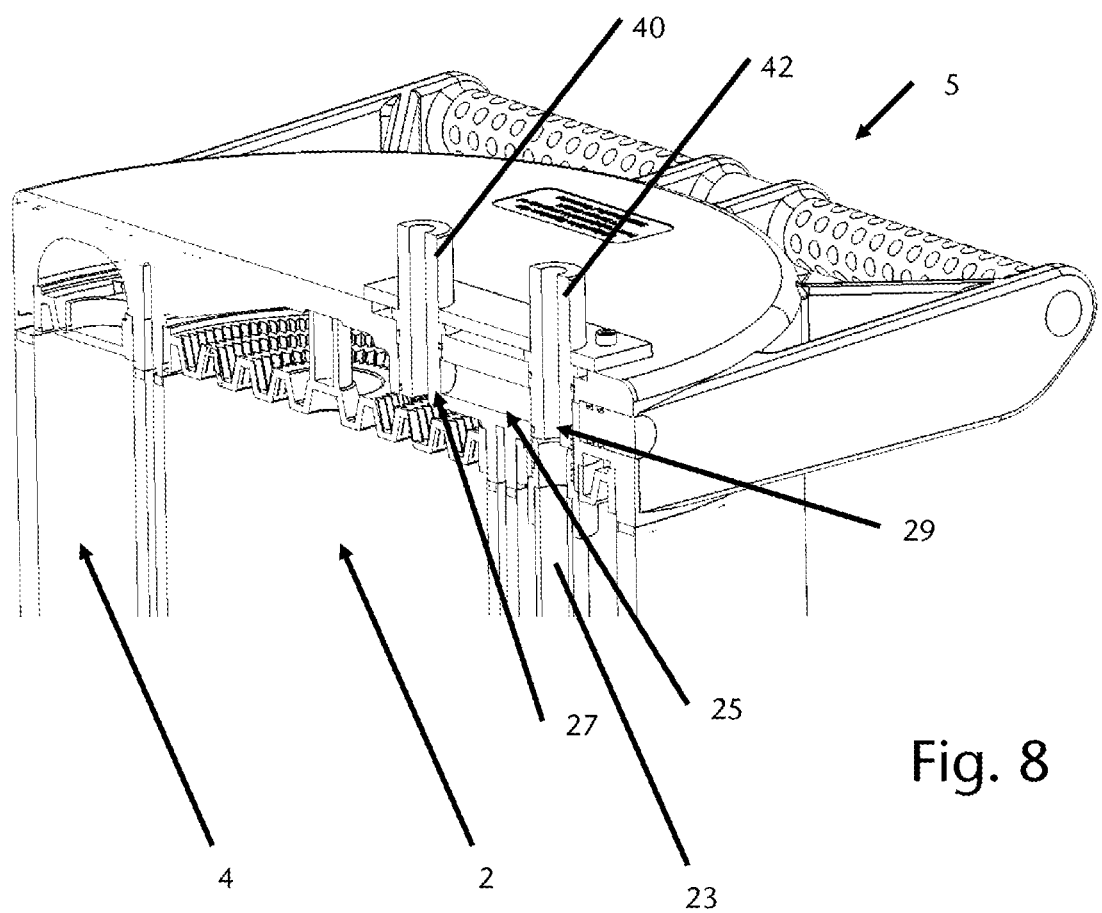
Figure 9:
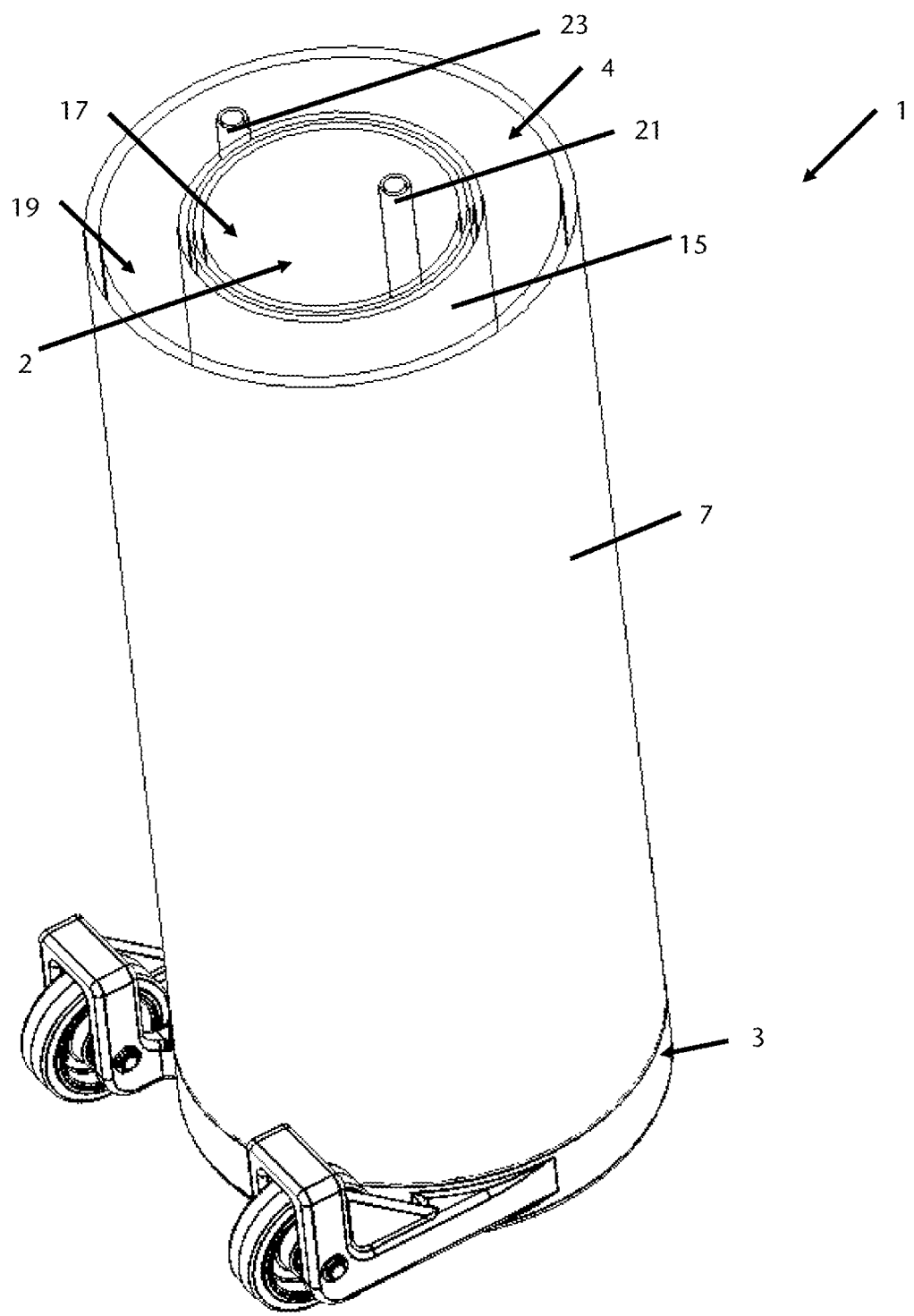

In order that the disclosure may be well understood, there will now be described various forms thereof, given by way of example, reference being made to the accompanying drawings, in which:

FIG. 1 a first form of a device for purifying fluids in an external view;

FIG. 2 a partial view of the device according to FIG. 1 in section;

FIG. 3 a first form of a bottom nozzle insert in section;

FIG. 4 the bottom nozzle insert according to FIG. 3 in a bottom view;

FIG. 5 a partial view of the device according to FIG. 1;

FIG. 6 a further partial view of the device according to FIG. 1 in section;

FIG. 7 a cross-sectional view of the cover part of the device according to FIG. 1;

FIG. 8 another sectional view of the cover part of the device according to FIG. 1;

FIG. 9 a cross-sectional view of the device according to FIG. 1

Figure 10:
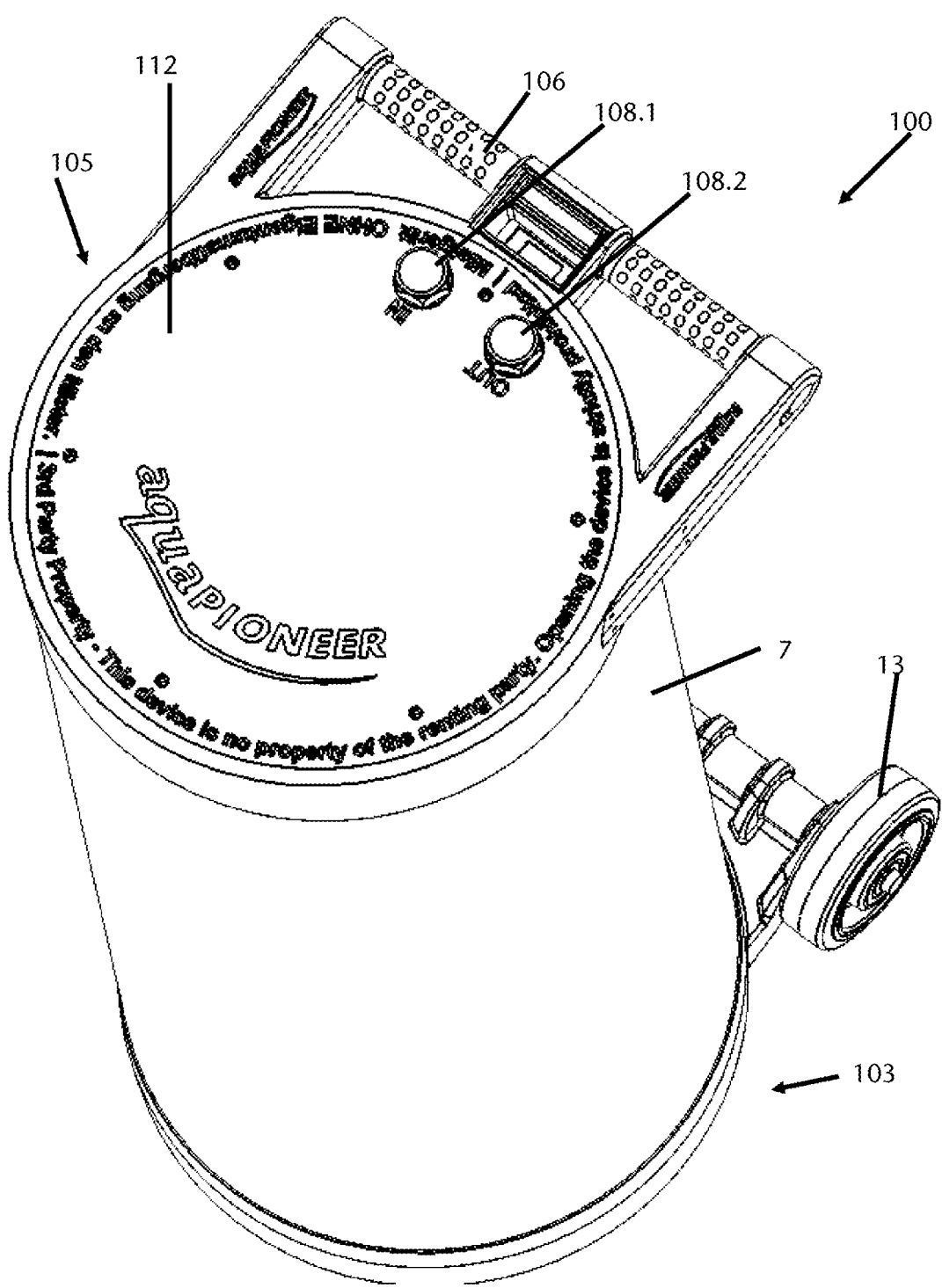
Figure 11:
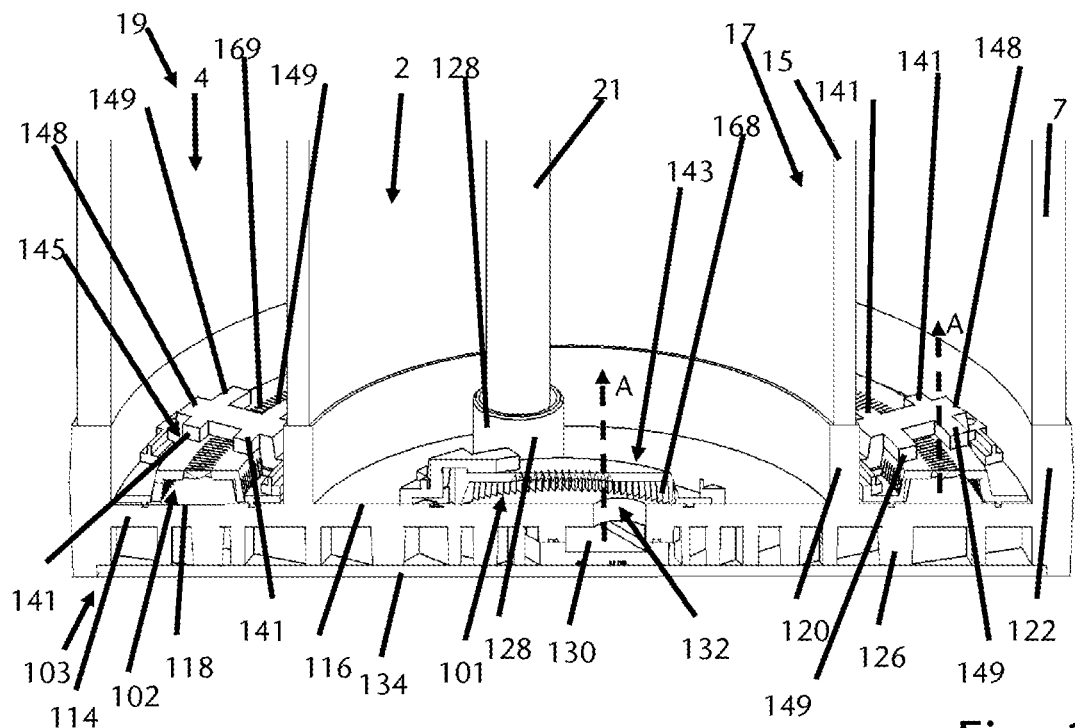
Figure 12:
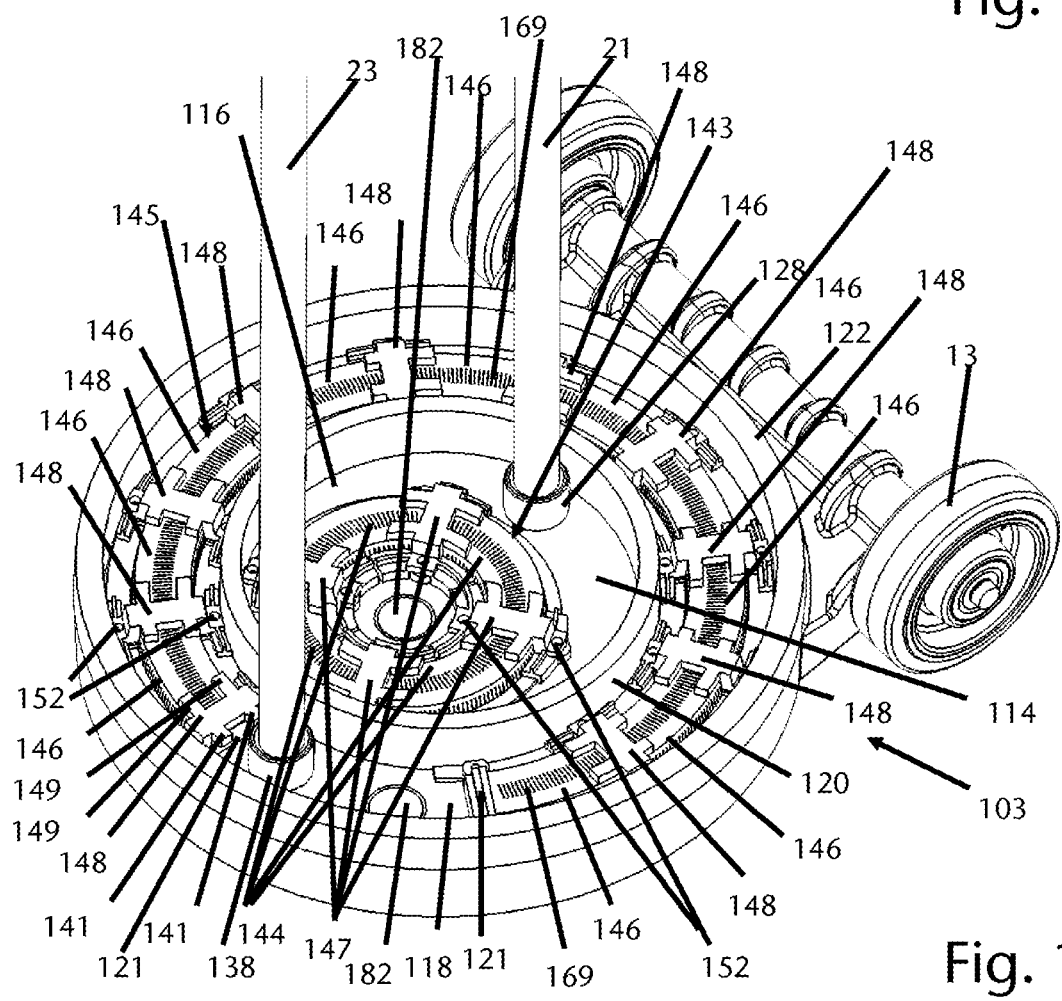
Figure 13:
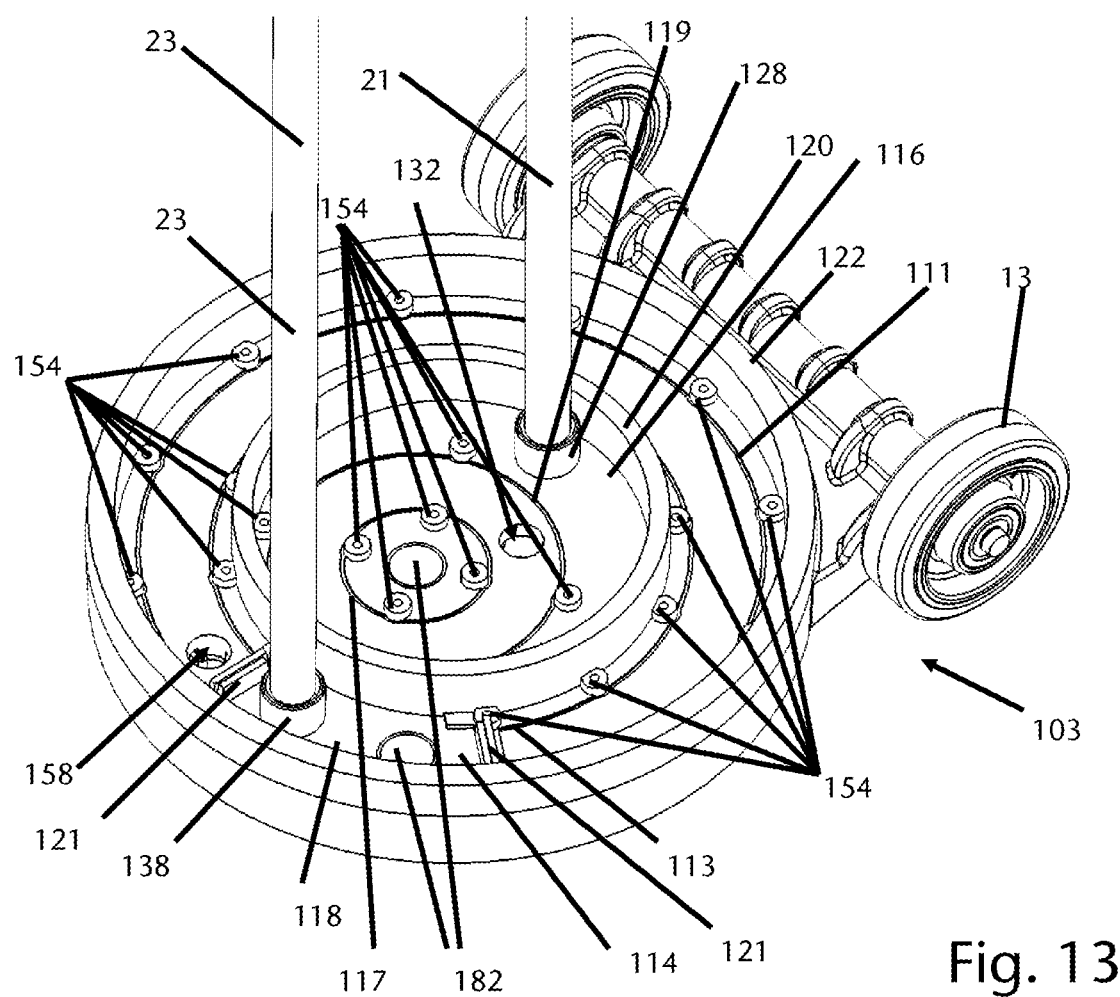
Figure 16:
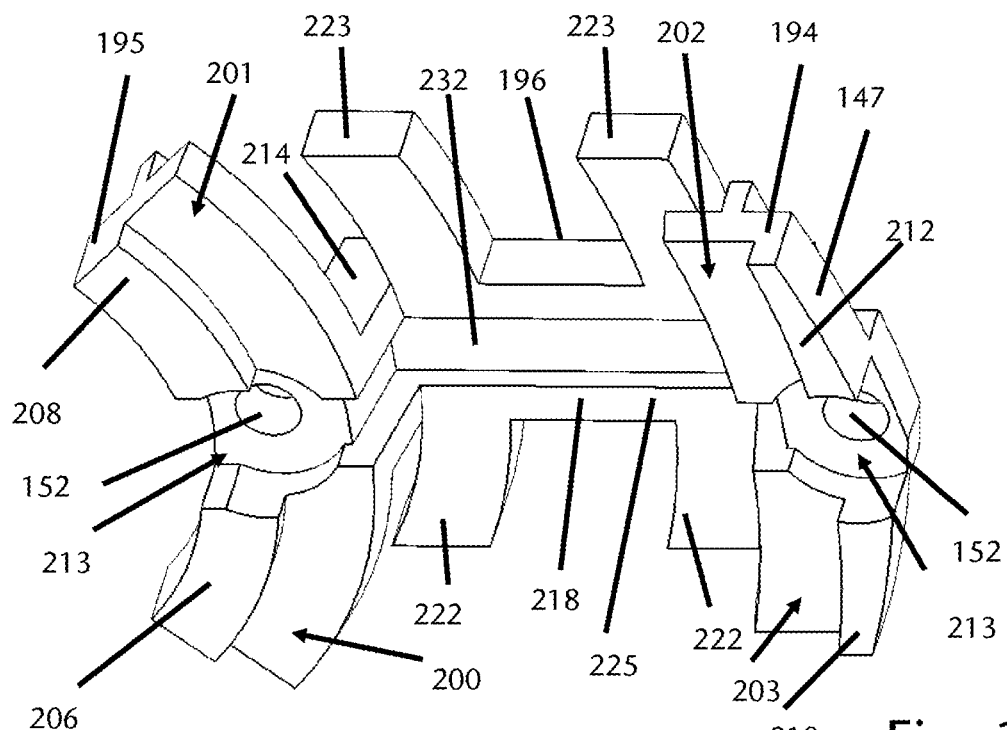
Figure 17:
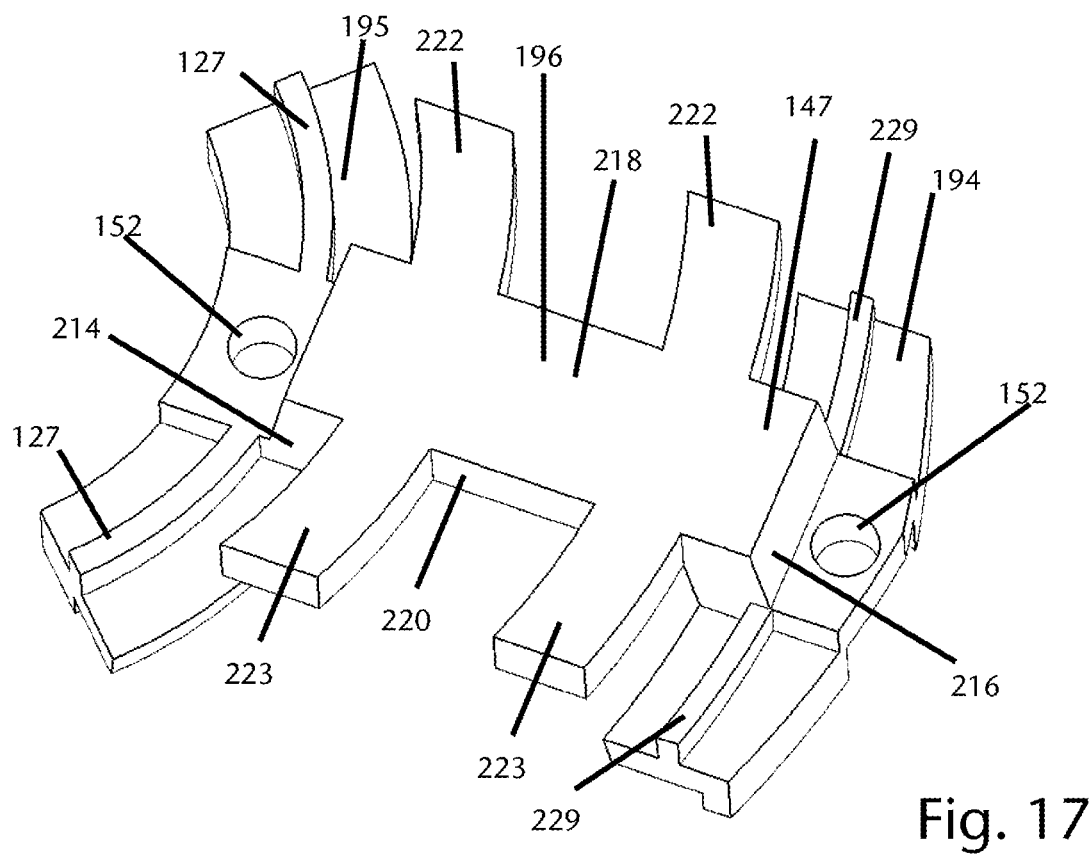
Figure 18:
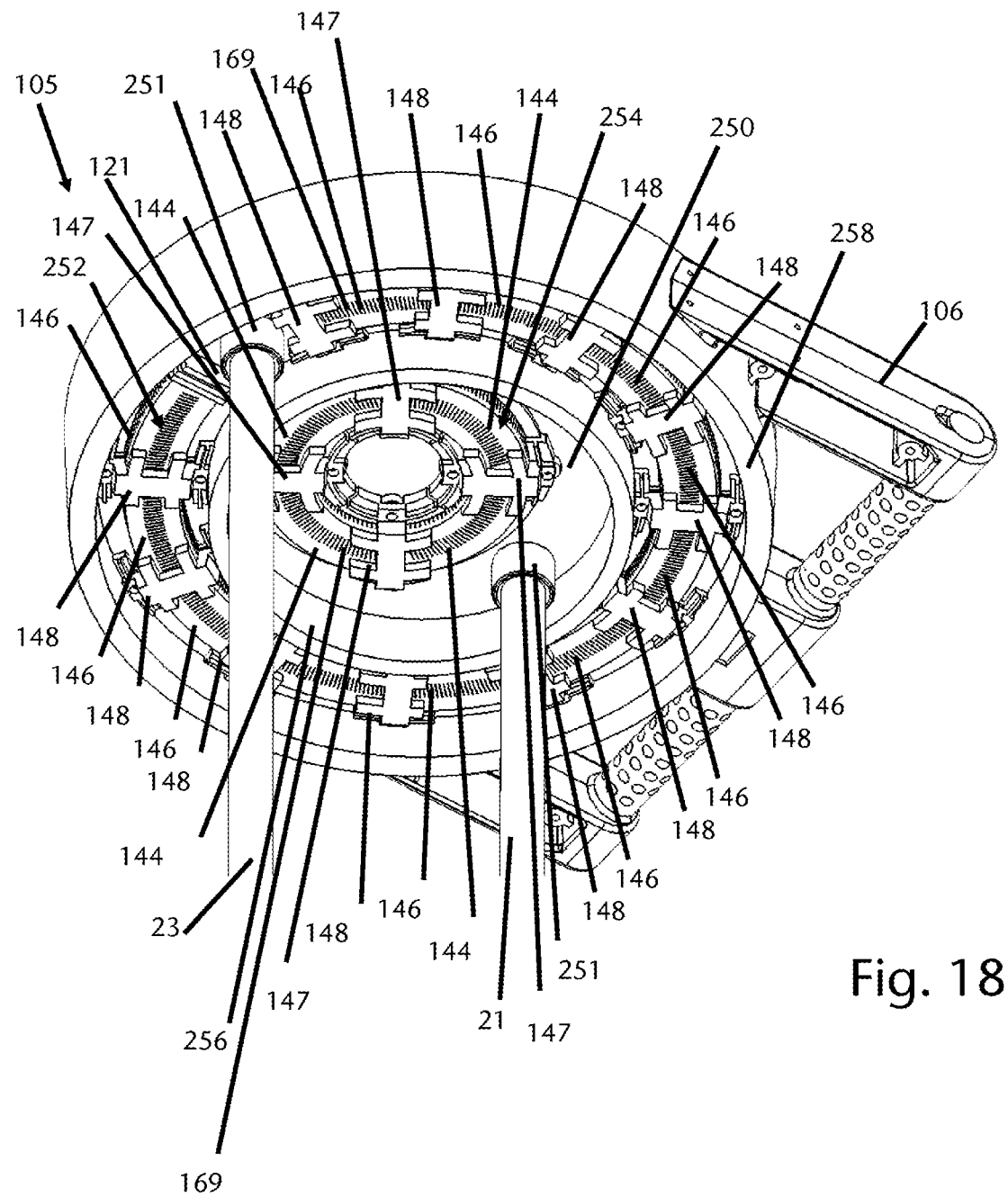

FIG. 10 a second form of a device according to the present disclosure;

FIG. 11 a partial view of a longitudinal section through the device according to FIG. 10;

FIG. 12 a partial view of the device according to FIG. 10 without outer and inner tubes;

FIG. 13 a partial view of the device according to FIG. 12 without bottom nozzle inserts;

FIG. 14 a perspective bottom view of a segment part;

FIG. 15 a perspective top view of the segment part shown in FIG. 14;

FIG. 16 a perspective bottom view of a connecting piece;

FIG. 17 a top perspective view of the connecting piece according to FIG. 16; and FIG. 18 a partial view of the device according to FIG. 10 without outer and inner tubes.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an external view of a first form of a device 1 for purifying fluids with an inlet line 9 and an outlet line 11. Fluids such as water can be introduced into the in-let line 9, which then flow out deionized through the outlet line 11. In some variations, adapters 40, 42 (FIG. 8) not shown here are used with hoses and pumps arranged on them. Inlet and outlet lines 9, 11 are arranged on a cover part 5. Furthermore, it can be seen from FIG. 1 that the cover part 5 comprises a type plate 12 which covers two further recesses or passages 27, 29 (FIG. 5), which are not visible here. The cover part 5 further comprises a handle 6, which enables a user to conveniently move the device 1 by rollers 13 arranged on a bottom part 3. An outer tube 7 is arranged between the bottom part 3 and the cover part 5.

FIG. 2 shows a partial view of the device 1 in the bottom area, in particular a longitudinal section through the bottom part 3 can be seen. In this sectional view it can be seen, firstly, that the outer tube 7 and the inner tube 15 define two volumes, namely a first volume 17 and a second volume 19. The volumes 17 and 19 are filled with an ion exchange resin not shown here for clarity. In some variations, the volumes 17 and 19 have different ion exchange resins.

The volumes 17 and 19 are closed off at the bottom by two bottom nozzle inserts 43 and 45. The first bottom nozzle insert 43 and the second bottom nozzle insert 45 each have a number of corrugations 62, which have a trapezoidal cross-section shown here as an example. Openings 60 are provided on shaft flanks 64 through which the fluid to be cleaned flows through a second supply line 23, here exemplarily for the second volume 19, from an outlet 41 into a second free space 48 between a second bottom area 46 and the second bottom nozzle insert 45.

This is clearly visible, for example, in FIG. 3, in which the first bottom nozzle insert 43 of the first volume 17 is shown in detail. The fluid flows out through a first supply line 21 from the outlet 39 into a first free space 47 below the first bottom nozzle insert 43. There, the fluid can quickly distribute in the bottom part 3. In some variations, no ion exchange resin is present in the free space 47 below the bottom nozzle insert 43, so that the distribution of the fluid is largely undisturbed. As fluid is continuously supplied through the supply line 21, it flows through the openings 60 on the flanks 64 of the corrugations 62 of the bottom nozzle insert 43. The flow direction A of the fluid is indicated by dashed arrows. As can be seen from FIG. 3, the openings 60 are slot-shaped and, in particular, as can also be seen in more detail from FIG. 4, are designed to taper from an upstream side 68 to a downstream side 66. The upstream side 68 thus has a different geometry of the flanks 64 than the downstream side 66 of the bottom nozzle insert 43. That is, each individual opening 60 of the bottom nozzle insert 43 is configured as a nozzle. This increases the flow velocity at the downstream side 66, so that an improved introduction of the fluid to be cleaned into the ion exchange resin not shown here, which is arranged in the first volume 17 on the downstream side 66, can take place.

FIG. 4 shows the first bottom nozzle insert 43 in a view from the upstream side 68. The aforementioned nozzle-shaped openings 60 of the corrugations 62 as well as openings 74 and 76 can be seen, which on the one hand allow the bottom nozzle insert 43 to be centered or aligned in the device and on the other hand allow the first supply line 21, which is not shown here in FIG. 4, to pass through. Furthermore, it can be seen from FIG. 4 that the bottom nozzle insert 43 has a number of protrusions 72 on its radially outer side which allow the bottom nozzle insert 43 to be clamped either in the bottom part 3 or in the inner tube 15 In some variations, the bottom nozzle insert 43 is inserted into the bottom part 3 and clamped and/or glued there. In a further form, it is provided that the protrusions 72 may be used for alignment in the bottom part 3. It will be understood that the second bottom nozzle insert 45 is of basically the same or similar construction, this being configured as a ring and adapted to the second volume 19. Where the term "number" is used in the present disclosure with reference to the protrusions, this is understood to mean at least three protrusions, for example 3, 4, 5, 6, 7, 8, 9, 10, 11, 12, 13, 14, 15, 16, 17, 18, 19, 20.

FIG. 5 shows the cover part 5 in a longitudinal section. Two passages 27 and 29 are arranged under the type plate 12, not shown here, which pass through the overflow line 25 and open into an ion exchange column 2 and 4, respectively. The passage 29, which opens in the outer ion exchanger 4, is connected to the supply line 23. The fluid flowing in the ion exchanger 2 and entering the second ion exchanger 4 through the recess 27 and the over-flow line 25 is directed through the supply line 23 under the bottom nozzle insert 45. It can further be seen from FIG. 5 that the passages 27 and 29 are closed by two plugs 35 and 37. The plugs 35, 37 may be screwed in, glued in or welded in place. Particularly, in some variations, the plugs 35 and 37 have seals. In a regeneration process, the plugs 35, 37 are opened or removed from the passages 27 and 29 and adapters 40, 42, (FIG. 8) or hose connections are inserted into the passages 27 and 29. When the adapters 40, 42, which are not shown in FIG. 5, are inserted, the over-flow line 25 is closed so that the ion exchange column 2 alone can be flowed to through the recess 27 and the ion exchange column 4 alone through the recess 29.

FIG. 6 shows another section of the cover part 5 of the device 1. It can be seen that the inlet line 9 is connected to the supply line 21. The first supply line 21 leads the fluid, which flows through the inlet line 9, under the first bottom nozzle insert 43. Hereupon, the fluid flows through the first bottom nozzle insert 43, which cannot be seen in FIG. 6, and rises in the first ion exchanger 2 or flows through it from bottom to top. After passing through the first cover nozzle insert 31, as can be seen in FIG. 5, it flows through the overflow line 25 into the second supply line 23 and then also through the corresponding bottom nozzle insert 45 and the second ion exchanger 4.

It can also be seen from FIG. 6 that the wall or inner tube 15 is double-walled. Thus, for ex-ample, a leakage in one of the walls will not immediately lead to a penetration of the fluid or the regeneration fluid into the other ion exchanger. Furthermore, it can be seen from FIGS. 5 and 6 that the cover nozzle inserts 31 and 33 are arranged in the device 1 in such a way that they act as nozzles when the regeneration liquid passes through the individual ion exchangers 2, 4 against the direction of flow of the regular liquid to be deionized. This also provides a uniform and safe flow of the regeneration liquid through dead spaces during regeneration.

From FIG. 7, it can be seen that after the fluid has flowed through the cover nozzle insert 33, it flows out of the outlet line 11.

In a regeneration process, when the plugs 35 and 37 have been removed and appropriate adapters 40, 42 have been inserted into the passages 27 and 29, a first fluid flow can occur through the passage 27 and the ion exchanger 2 to the inlet line 9 and a second fluid flow can occur through the recess 29 through the second ion exchanger 4 to the outlet line 11, or vice versa in each case. This allows different regeneration liquids to pass through the different ion exchangers 2, 4 or ion exchanger resins without endangering or forcing a mixing of the regeneration liquids. After regeneration is complete, the adapters 40, 42 for the regeneration liquids are removed from passages 27 and 29 and new plugs or the old plugs 35 and 37 are inserted into said passages 27 and 29.

From FIG. 7 it can be clearly seen how the inlet line 9 the outlet line 11 and the overflow line 25 are arranged in the cover part 5. Due to the design and for possible cleaning work, a plug 10 is arranged in the inlet line 9 and a plug 30 in the overflow line 25. It can be seen that when each ion exchange column 2, 4 is considered separately, the inlet line 9 of the device 1 represents the inlet line of the first ion exchange column 2, and the overflow line 25 of the device 1 represents the outlet line of the first ion exchange column 2. Accordingly, for the second deionization column 4 with the second volume 19, the overflow line 25 of the device 1 represents the inlet line of the second ion exchange column 4 and the outlet line 11 of the device 1 represents the outlet line of the second ion exchange column 4. This applies in particular to regular operation, i.e. for the deionization of liquids, in particular water.

FIG. 8 shows another sectional view of the cover part 5 with adapters 40 and 41 inserted in the passages 27 and 29. In some variations, hoses are connected to the adapters 40 and 41, through which the respective regeneration fluids for the different deionization resins in the two ion exchange columns 2 and 4 are introduced into the device 1.

In the cross-section of FIG. 9, it is again shown how the individual ion exchange columns 2 and 4 are constructed. It can also be seen from FIG. 9 that the supply line 21 runs in the first volume 17 of the first ion exchange column 2 and the supply line 23 runs in the second volume 19 of the second ion exchange column 4.

FIG. 10 shows that the second form of the device 100 differs substantially from the first form in that the bottom part 103 and the cover part 105 are formed differently than in the first form of the device 1. The cover part 105 has a cover plate 112 that covers recesses and conduits not shown here. As in the first form of the device 1, the cover part 105 also comprises a handle 106. Furthermore, the bottom part 103 also comprises rollers 13. As in the first form, an outer tube 7 and an inner tube 15 (FIG. 11) not shown, are arranged between the bottom part 103 and the cover part 105. The inlet and outlet lines in the cover part 103, which are not shown, are each closed by caps 108.

FIG. 11 shows that the bottom part 103 includes a carrier plate 114 formed as an intermediate bottom, which is integrally formed with the bottom part 103. The carrier plate 114 has an inner circular section 116 for a first bottom nozzle insert 143 and the first ion exchange column 2, and an outer annular section 118 for a second bottom nozzle insert 145 and the second ion exchange column 4. A first free space 101 is formed between the first bottom nozzle insert 143 and the bottom part 103. A second free space 102 is arranged between the second bottom nozzle insert 145 and the bottom part 103. The outer tube 7 and the inner tube 15 define a first volume 17 and a second volume 19, respectively, as described above with respect to the device 1. For arranging the inner tube 15 and the outer tube 7, the carrier plate 114 has an inner annular separating wall 120 and an outer annular separating wall 122, which are also formed integrally with the bottom part 103 and divide the carrier plate 114 into the two sections 116, 118 described above. A ribbing 126 is formed on the under-side of the carrier plate 114. The carrier plate 114 has a connection piece 128 for the first supply line 21 in the inner section 116. Fluid can be introduced through the connection piece 128 into a conduit 130 below the carrier plate 114. The conduit 130 opens into a first opening or outlet 132 of the support plate 114 associated with the first bottom nozzle insert 143. The ribbing 126 and the conduit 130 are closed by a bottom cover 134. The direction of flow A of fluid through the bottom nozzle inserts 143, 145 during regular operation is indicated by dashed arrows.

FIG. 12 shows that the bottom nozzle inserts 143, 145 have ring-section segment parts 144, 146 that are attached to each other and to the carrier plate 114 by connecting pieces 147, 148. The first bottom nozzle insert 143 is formed as a closed ring of four first segment parts 144 and four first connecting pieces 147. The second bottom nozzle insert 145 is formed as an open ring of ten second segment parts 146 and ten second connecting pieces 148. The aforementioned segment parts 144, 146 of the first and second bottom nozzle inserts 143, 145 differ substantially only in length and curvature. This also applies accordingly to the connecting pieces 147, 148. The connecting pieces 147, 148 each have two eyelets 152 for attachment to the carrier plate 114.

As shown in FIG. 13, the carrier plate 114 has a corresponding number of eyelets 154. The outer annular section 118 of the carrier plate 114 has twenty-two eyelets 154. The inner circular section 116 of the carrier plate 114 has eight eyelets 154. The carrier plate 114 includes a second connection piece 138 for the second supply line 23, which terminates in a line not shown below the carrier plate 114. This conduit terminates in a second opening or outlet 158 of the carrier plate 114, respectively, which is associated with the free space 102 between the bottom part 103 and the second bottom nozzle insert 145, see FIG. 11. The carrier plate 114 has two centering openings for two centering plugs 182, which are attached to the bottom cover 134. The carrier plate 114 has four grooves 111, 113, 117, 119 for corresponding strip-shaped projections 174, 176 of the bottom nozzle inserts 143, 145 to prevent slipping, see FIG. 14. The two grooves 111, 113 on the inner circular section 116 are formed as concentric circles. The two grooves 117, 119 on the outer annular section 118 are formed as parallel circular sections. For laterally closing the second bottom nozzle insert 145, two end pieces 121 are arranged on the carrier plate 114, which virtually connect the opposite ends of the grooves 117, 119.

FIG. 14 shows that a first segment part 144 of the first bottom nozzle insert 143 includes a groove 160 with opposing sidewalls 162, 164 and a bottom 166 connecting them. The groove 160 is formed on the upstream side of the segment part 144. A plurality of adjacent strip-shaped openings 168 are formed on the sidewalls 162, 164 and the bottom 166. The openings 168 have a substantially triangular cross-section and are tapering. The segment parts 144 have two edges 170, 172. The first edge 170 projects outwardly away from an end of the inner sidewall 164 remote from the bottom 166 and parallel to the bottom 166. The second edge 172 projects outwardly away from the end of the outer sidewall 162 remote from the bottom 166 and parallel to the bottom 166. Strip-shaped projections 174, 176 are formed on each of the edges 170, 172 for the grooves 117, 119 of the carrier plate 114. The edges 170, 172 have circular section-shaped recesses 173 for the eyelets 154 of the carrier plate 114.

FIG. 15 shows that the strip-shaped openings 168 narrow toward the downstream side of the segment part 144 shown, or in the flow direction A of the fluid, to form elongated slots 169. The flow direction A is indicated by dashed arrows, see also FIG. 14. During normal operation of the device 100, a fluid introduced from the upstream side shown in FIG. 14 flows through the slots 169 from the bottom nozzle insert 143 into the first ion ex-change column 2. Each segment part 144 has at least two straight end faces 184 and two curved longitudinal sides 186, 187 that frame a top side 188 and a bottom side 189. At the end faces 184, for example, four segment parts 144 can be arranged together to form an annular nozzle insert 143. The segment part 144 has two elongated projections 190 arranged on the end faces, which project backwards from the groove 160 and from the top side 188, respectively.

FIG. 16 shows that the connector 147 has two foot parts 194, 195 connected by a bridge-like web 196 having an inverted substantially U-shaped cross-section. A fastening eyelet 152 is formed on each of the foot parts 194, 196. Further, the foot parts 194, 196 include receptacles 200, 201, 202, 203 for one of the edges 170, 172 of the segment part 144. The receptacles 200, 201 are formed on the foot part 195. The receptacles 202, 203 are formed on the foot part 194. The receptacles 200, 201, 202, 203 are formed as recesses. Contact surfaces 206, 208, 210, 212 are formed on each of the foot parts 194, 195 adjacent to the receptacles 200, 201, 202, 203 for arranging on the carrier plate 114. Between the contact surfaces 206, 208, 210, 212 and the receptacles 200, 201, 202, 203, a recess 213 for the eyelets 154 of the carrier plate 114 is formed in each case on the foot part 194, 195 below the fastening eye-lets 152. In order to realize a positionally secure arrangement of two segment parts 144 during assembly by a connecting piece 147, the web 196 has a receptacle 232 on the underside, which is arranged centrally and which connects the recesses 213 to one another and thus symmetrically subdivides the connecting piece 147. Two elongated projections 190 of the segment parts 144 can be positively arranged in this receptacle 232.

FIG. 17 shows that two elongated reinforcing struts 227, 229 are arranged at the top of each of the foot parts 194, 195 of the connecting piece 147. The web 196 includes two laterally angled sections 214, 216 connected at one end to the foot parts 194, 195. The web 196 further includes a connecting section 218 that connects the angled sections 214, 216 to each other. The connecting section 218 includes two end faces 220. Two pairs of spaced-apart support sections 222, 223 are arranged on each of these end faces 220. The support sections 222, 223 are formed substantially as curved cuboids projecting from the end faces 220 of the connecting section 218. The underside 225 of the support sections 222, 223 and the connecting section 218 serves as an abutment for the top side 188 of the segment part 144 shown in FIG. 15, see FIG. 16.

The segment parts 146 of the second bottom nozzle insert 145 shown in FIGS. 11 and 12 differ from the segment parts 144 of the first bottom nozzle insert 143 substantially only in dimension and curvature. Accordingly, this also applies to the connecting pieces 148 of the second bottom nozzle insert 145, which, unlike the connecting pieces 147, further comprise a pair of short support sections 141 and a pair of long support sections 149, see FIGS. 11 and 12.

FIG. 18 shows that cover part 105 includes an arrangement of carrier plate 250 and cover nozzle inserts 252, 254 arranged in substantially mirror image with respect to bottom nozzle inserts 143, 145 and carrier plate 114 on said bottom part 103, see FIG. 11, FIG. 12 and FIG. 13. The cover nozzle inserts 252, 254 include the same segment parts 144, 146 and connecting pieces 147, 148 as the previously described bottom nozzle inserts 143, 145. The first inner circular cover nozzle insert 254 is formed like the first inner bottom nozzle insert 143. The second outer arcuate cover nozzle insert 252 is formed like the second outer bottom nozzle insert 145. As with the carrier plate 114 of the bottom plate 103, end pieces 121 are arranged on the carrier plate 250 for laterally closing the cover nozzle insert 254. Like the carrier plate 114 of the bottom part 103, the carrier plate 250 of the cover part 105 has fastening eyelets for the cover nozzle inserts 252, 254, which are not shown. The carrier plate 250 has two connection pieces 251 for the supply lines 21, 23. Like the carrier plate 114 of the bottom part 103, the carrier plate 250 has an inner annular separating wall 256 and an outer annular separating wall 258. The cover part 105 is formed in a substantially mirror-image manner like the bottom part 103. However, the carrier plate 250 does not have centering openings. The cover plate 112 of the cover part 105 shown in FIG. 10, like the bottom cover 134 in the bottom part 103, serves to cover a ribbing not shown and conduits not shown, which are formed on the not shown upper surface of the support plate 250.

During deionization, fluid is directed into the first supply line 21 to the bottom part 103 via an inlet line not shown in the cover part 105. Fluid then enters the first free space 101 between the carrier plate 114 of the bottom part 103 and the bottom nozzle insert 143 via the conduit 130 and the outlet 132 in the carrier plate 114 of the bottom part 103. Fluid flows into the first ion exchange column 2 through the slots 169 of the bottom nozzle insert 143 and rises to the first cover nozzle insert 252. The fluid flows through the slots 169 of the cover nozzle insert 252 into a free space between the cover nozzle insert 252 and the carrier plate 250 of the cover part 105. The fluid then flows through an opening in the carrier plate 250, which is not shown, into an overflow line 25 (FIG. 6), which is not shown, and from there into the second supply line 23 associated with the second ion exchange column 4. The fluid then passes through the outlet 158 into the second free space 102 between the carrier plate 114 and the second bottom nozzle insert 145. The fluid introduced into the second ion exchange column 4 via the slots 169 of the second bottom nozzle insert 145 then rises to the cover nozzle insert 254, where it passes via the slots 169 of the cover nozzle insert 254 into a free space between the carrier plate 250 and the cover nozzle insert 252, and from there via an opening not shown to an outlet line not shown. During regeneration, the direction of flow is opposite. The regeneration fluid, or the regeneration fluids, are introduced into the ion exchanger columns 2, 4 via the slots 169 of the cover nozzle inserts 252, 254 in a uniformly distributed manner.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A device for purifying at least one fluid, comprising:
a first ion exchange column,
an inlet line, and
an outlet line,
wherein:
the inlet line and the outlet line are associated with a cover part,
the inlet line is connected to a first supply line into a first free space between a bottom part and at least one nozzle insert, which is formed as a first bottom nozzle insert,
the first bottom nozzle insert has a number of openings for the passage of the fluid,
the openings are distributed over at least a partial surface of the first bottom nozzle insert, by means of which the fluid can be introduced into a first volume of the first ion exchange column which can be filled with an ion exchange resin, and
the first bottom nozzle insert comprises at least two segment parts that are attached to each other, and
wherein:
at least one of the at least two segment parts has at least one edge and/or at least one projection to enable a stable arrangement of the segment parts by positive locking, and/or
the first bottom nozzle insert comprises at least one connecting piece, and the at least two segment parts are attached to each other by means of the at least one connecting piece.

2. The device according to claim 1, wherein the at least two segment parts are ring section-shaped or circular section-shaped.

3. The device according to claim 1 wherein at least one nozzle insert is arranged on the cover part, which is formed as a first cover nozzle insert.

4. The device according to claim 3, wherein the first cover nozzle insert comprises at least two ring section-shaped or circular section-shaped segment parts that are attached to each other.

5. The device according to claim 4, wherein the first cover nozzle insert has at least one connecting piece, and the at least two segment parts are attached to each other by means of the at least one connecting piece.

6. The device according to claim 1 wherein the at least one nozzle insert or at least one of the at least two segment parts comprises at least one groove having a first side wall, a second side wall opposite thereto, and a bottom connecting the side walls;
the openings are formed on the first side wall, the second side wall and/or the bottom of the at least one groove.

7. The device according to claim 6, wherein the openings have at least partially a narrowing cross-section in a flow direction.

8. The device according to claim 7, wherein the openings narrow into slots in the flow direction.

9. The device according to claim 8, wherein the device comprises at least two interleaved ion exchange columns comprising the first ion exchange column and a second ion exchange column.

10. The device according to claim 9, wherein the device comprises the bottom part and the cover part between which at least an inner tube and an outer tube are arranged,
the inner tube is arranged in the outer tube,
the first ion exchange column comprises the first volume of the inner tube, and the second ion exchange column comprises a second volume present between the inner tube and the outer tube;
the cover part comprises an overflow line connecting the first volume to the second volume present between the inner tube and the outer tube.

11. The device according to claim 10, wherein the overflow line comprises two closable passages, a first passage is associated with the first volume and a second passage is associated with the second volume.

12. A nozzle insert for at least one ion exchange column, the nozzle insert comprising:
a number of openings which are distributed over at least a partial surface of the nozzle insert and by means of which a fluid can be introduced into a volume of the ion exchange column which can be filled with an ion exchange resin,
at least two segment parts that are attached to each other, wherein
at least one of the at least two segment parts has at least one edge and/or at least one projection to enable a stable arrangement of the segment parts by positive locking, and/or
the nozzle insert has at least one connecting piece, and the at least two segment parts are attached to each other by means of the at least one connecting piece.

13. The nozzle insert according to claim 12, wherein the at least two segment parts are ring section-shaped or circular section-shaped.

14. The nozzle insert according to claim 12, wherein the nozzle insert or at least one of the at least two segment parts comprises a groove having a first side wall, a second side wall opposite thereto, and a bottom connecting the side walls, and the openings are formed on the first side wall, the second side wall and/or the bottom of the groove.

15. The nozzle insert according to claim 12, wherein the openings have a narrowing cross section in a flow direction.

16. The nozzle insert according to claim 15, wherein the openings narrow into slots in the flow direction.

17. A method of deionizing a fluid with the device according to claim 1, wherein the fluid is passed without ion exchange through the first supply line through the first volume which first volume is filled with an ion exchange resin, and the fluid is then introduced into the first volume for ion exchange.

18. The method according to claim 17, wherein the fluid is introduced into said inlet line, the fluid is directed through the first supply line into the first free space, and the fluid is introduced into the first volume through the openings such that the fluid flows through the first ion exchange column.

19. The method according to claim 17, wherein the fluid is passed without ion exchange through a second volume of a second ion exchange column which second volume is filled with an ion exchange resin, and the fluid is then introduced into the second volume for ion exchange.

20. The method according to claim 19, wherein the fluid is introduced via an overflow line into a second supply line, the second supply line opens into a second free space between a bottom part and a nozzle insert formed as a second bottom nozzle insert, and the second bottom nozzle insert has a number of openings which are distributed over at least a partial surface of the second bottom nozzle insert and by means of which the fluid is introduced into the second volume such that the fluid flows through the second ion exchange column.

* * * * *